United States Patent
Shibata et al.

(10) Patent No.: US 7,167,730 B2
(45) Date of Patent: Jan. 23, 2007

(54) COMMUNICATION TERMINAL APPARATUS AND METHOD OF CONTROLLING THE SAME, SERVER APPARATUS AND METHOD OF CONTROLLING THE SAME, AND STORAGE MEDIA

(75) Inventors: Takaaki Shibata, Hamamatsu (JP);
Hiroaki Takahashi, Hamamatsu (JP);
Takuya Takahashi, Hamamatsu (JP);
Atsushi Yamaura, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 668 days.

(21) Appl. No.: 10/043,846

(22) Filed: Jan. 11, 2002

(65) Prior Publication Data

US 2002/0094804 A1 Jul. 18, 2002

(30) Foreign Application Priority Data

Jan. 15, 2001 (JP) ............................. 2001-006834

(51) Int. Cl.
*H04M 1/00* (2006.01)
(52) U.S. Cl. ...................................... 455/566
(58) Field of Classification Search ................ 455/566, 455/567, 419, 414.2
See application file for complete search history.

(56) References Cited

U.S. PATENT DOCUMENTS

| | | | |
|---|---|---|---|
| 6,005,563 A | | 12/1999 | White et al. |
| 6,516,323 B1 * | | 2/2003 | Kamba ..................... 707/104.1 |
| 2001/0004397 A1 * | | 6/2001 | Kita et al. .................. 381/334 |
| 2002/0087656 A1 * | | 7/2002 | Gargiulo et al. ............ 709/217 |
| 2004/0007120 A1 * | | 1/2004 | Futamase et al. ............. 84/622 |

FOREIGN PATENT DOCUMENTS

| | | |
|---|---|---|
| EP | 0973350 | 1/2000 |
| JP | 10-124030 | 5/1998 |
| JP | 10-133671 | 5/1998 |
| JP | 10-207479 | 8/1998 |
| JP | 11-073360 | 3/1999 |
| JP | 11-150517 | 6/1999 |
| JP | 11-225443 | 8/1999 |
| JP | 11-261625 | 9/1999 |
| JP | 2000-092117 | 3/2000 |
| WO | WO 00/65475 | 11/2000 |
| WO | WO 00/79714 | 12/2000 |

OTHER PUBLICATIONS

Zhimei Jiang and Leonard Kleinrock, "Prefetching Links on the WWW", Communications, 1997, ICC '97 Montreal, Towards the Knowledge Millennium, 1997 IEEE International Conference on Montreal, Jun. 8, 1997, pp. 483-489.

* cited by examiner

*Primary Examiner*—Creighton Smith
(74) *Attorney, Agent, or Firm*—Morrison & Foerster LLP

(57) ABSTRACT

There is provided a communication terminal apparatus that enables quick response in screen display and quick retrieval of desired melodies in a musical tone data distributing service and reduces a communication fee. A java incoming call melody program including core display data is received from a server apparatus through the Internet and is stored in a RAM. When the stored program is executed, a display screen is formed based on the core display data according to the program and is displayed on a display. A cellular phone receives the distributing service by receiving desired musical tone data from the server apparatus via the Internet using the display screen.

2 Claims, 14 Drawing Sheets

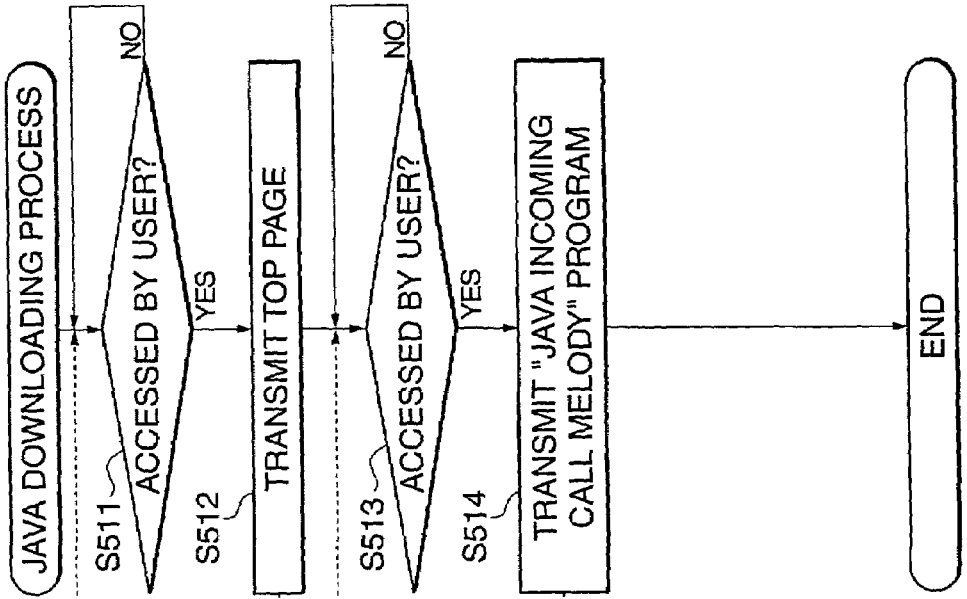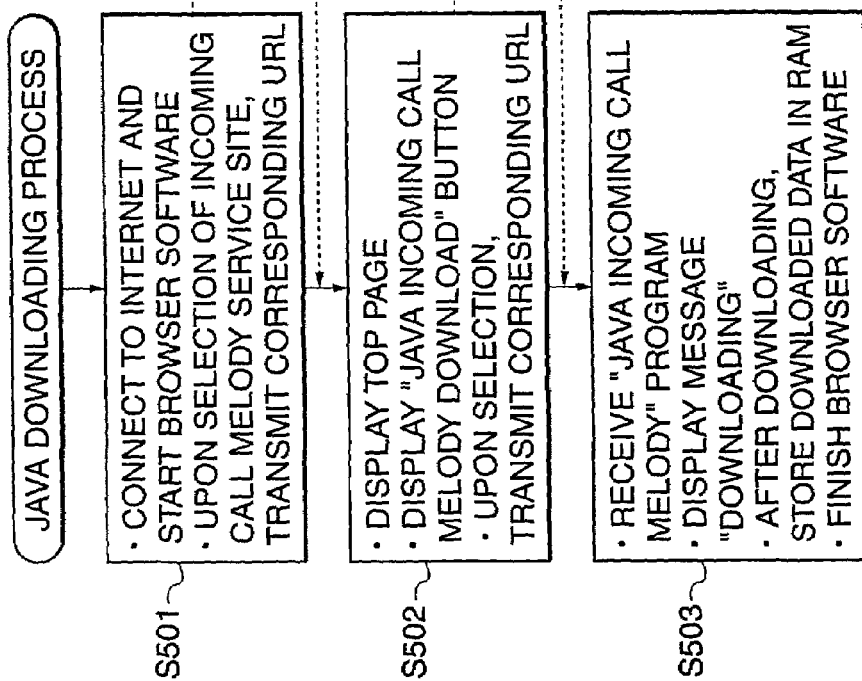

FIG. 7

MELOCCHA!

MELODY TITLE REPRESENTED
BY FREE WORD
(EIGHT OR LESS HIRAGANA LETTERS)

FREE WORD OF ARTIST NAME
REPRESENTED BY FREE WORD
(EIGHT OR LESS HIRAGANA LETTERS)

NEW ARRIVAL INFORMATION

MELODY SEARCH

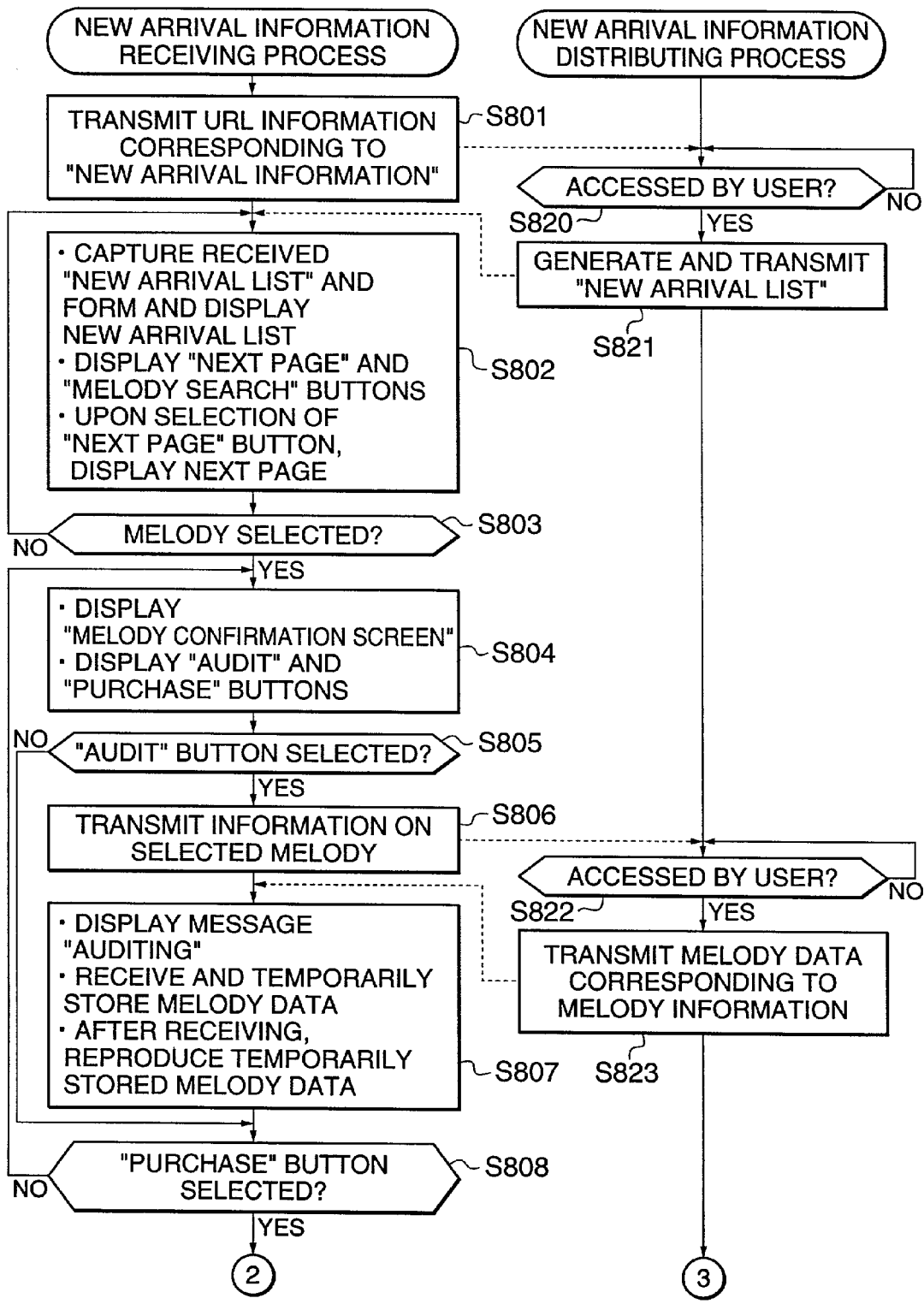

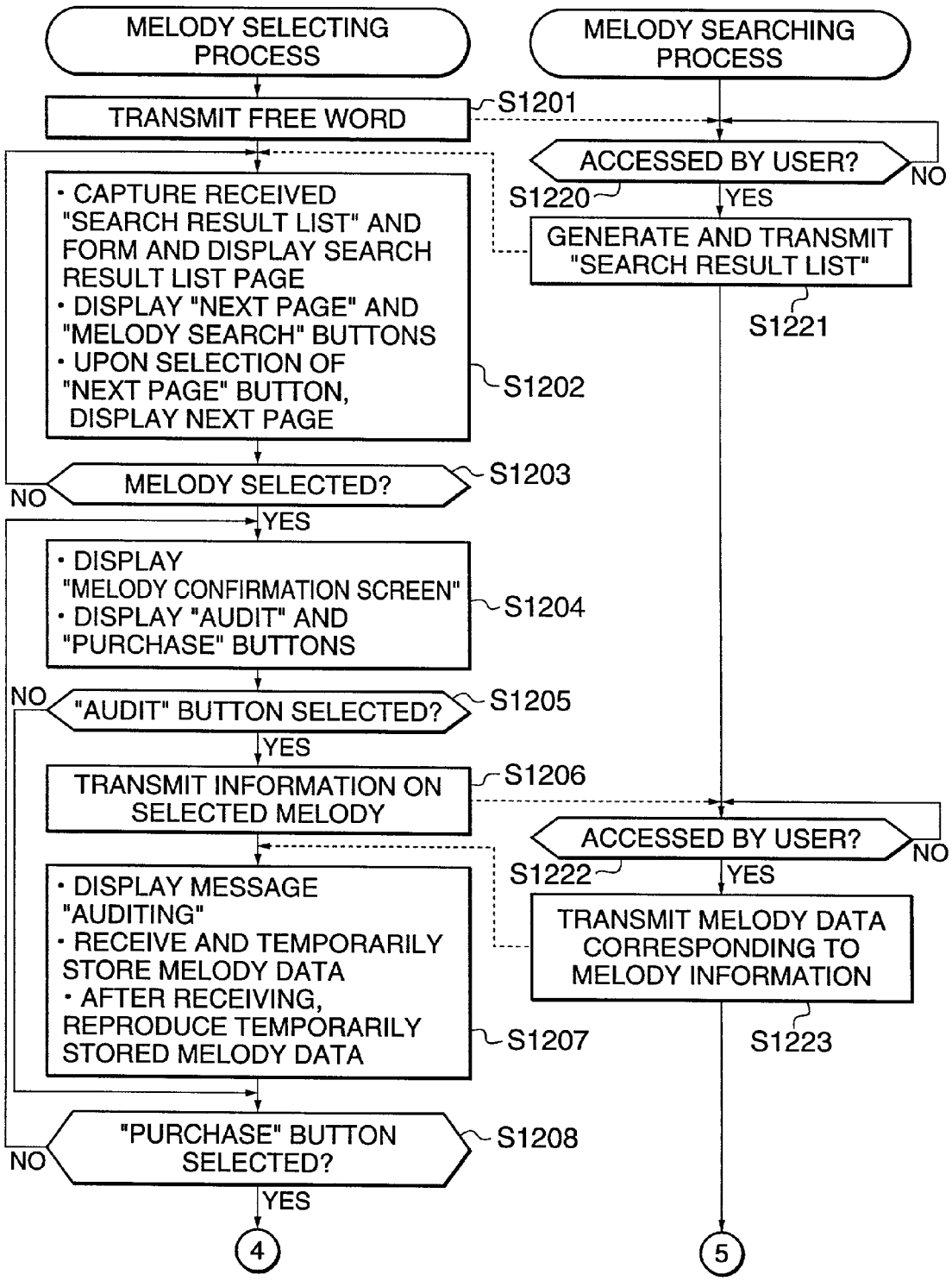

COMMUNICATION TERMINAL APPARATUS AND METHOD OF CONTROLLING THE SAME, SERVER APPARATUS AND METHOD OF CONTROLLING THE SAME, AND STORAGE MEDIA

BACKGROUND OF THE INVENTION

1. Field of the Invention

This invention relates to a communication terminal apparatus such as a cellular phone and a method of controlling the same, a server apparatus and a method of controlling the same, and storage media storing respective programs for implementing these methods, which utilize a service of distributing musical tone data such as incoming call melodies via the Internet and the like.

2. Description of the Related Art

Conventionally, there are known communication terminal apparatuses such as cellular phones that receive a service of distributing musical tone data such as incoming call melodies provided by server apparatuses through networks such as the Internet. These communication terminal apparatuses such as the I-mode and the J-sky Web have a function of connecting to a web server on the Internet, and have a tone generator circuit to enable reproduction (automatic performance) of obtained musical tone data as an alert sound, for example. To receive the service, browser software is started by the communication terminal apparatus to display a search screen, a menu, or the like required for retrieving and designating desired musical tone data on a display. Display data for displaying the display screen is transmitted as an HTML file from the server apparatus.

For example, the browser software accesses a site to receive the musical tone data distributing service, downloads and displays a top page, and then sequentially changes the screen display by downloading display data such as a new arrival information list screen, a melody search screen, a melody purchase screen according to the operation of the user. The user downloads desired incoming call melody data by designating an incoming call melody or the like on the screen and requesting the server apparatus to provide it.

In the above described conventional communication terminal apparatus, a plurality of screens such as a top page, a list screen, and a search screen are displayed until the purchase of a melody, but when changing screens to be displayed, the browser software accesses the server apparatus every time the screen display is changed (once per display screen) to download next display data via the Internet. This necessitates a large number of times of access to the server apparatus and results in slow response in screen display.

Further, in data communication by cellular phones via the Internet, packet communication fees are usually charged according to the amount of communication data. Since such a packet communication fee is charged even if display data is downloaded one by one, the packet communication fee is charged whenever the display screen is changed, in addition to a communication fee that is charged for downloading of musical tone data itself. Thus, if it is unavoidable to download a plurality of display data until the purchase of a melody, a high packet communication fee is charged.

In particular, in a service which permits downloading of a plurality of melodies (e.g. ten) at a flat rate per month, a user usually accesses the same service site at certain time or day intervals. In this case, even if it is only necessary to display the same screen as a previous one in order to obtain musical tone data, display data must always be downloaded again. This slows the response in screen display and raises the packet communication fee, and accordingly, it has been desired to take proper measures to solve such problems.

Further, the conventional communication terminal apparatus necessitates repeatedly accessing the server apparatus and selecting items while receiving display data required for displaying screens one by one. For example, to select a desired incoming call melody, one of a plurality of incoming call melody service webs is selected after a top page of an incoming call melody service is displayed, and a predetermined item is selected on a top page of the selected service web so as to select a further detailed genre and category. Moreover, in many cases, it takes much time to reach a desired melody due to a wide range of search results. This necessitates a large number of times of access to the server apparatus until a desired search result is obtained, and causes a problem of making it difficult to retrieve a desired melody in a short period of time, in addition to the above-mentioned problems relating to the response and the communication fee.

SUMMARY OF THE INVENTION

It is therefore an object of the present invention to provide a communication terminal apparatus and a method of controlling the same, and a server apparatus and a method of controlling the same, which reduce the number of times the communication terminal apparatus accesses the server apparatus to enable quick response in screen display when receiving a musical tone data distributing service, enable quick search for a desired melody, and reduce a communication fee, and storage media storing respective programs for implementing these methods.

To attain the above-mentioned object, according to a first aspect of the present invention, there is provided a communication terminal apparatus comprising a display device that provides display for receiving a musical tone data distributing service from a server apparatus, a musical tone data receiving device that receives desired musical tone data via a network by means of the display provided by the display device, a musical tone generating device that generates a musical tone according to the musical tone data received by the musical tone data receiving device, a program receiving device that receives a predetermined program executable by the communication terminal apparatus from the server apparatus via the network, a display data receiving device that receives display data for forming the display on the display device from the server apparatus via the network, a storage device that stores the predetermined program received by the program receiving device and the display data received by the display data receiving device, and a program executing device that executes the predetermined program stored in the storage device, wherein at least a part of the display provided by the display device is carried out based on the display data stored in advance in the storage device, according to the predetermined program executed by the program executing device.

With this arrangement, when a musical tone data distributing service is received, desired musical tone data is received using the display from the server apparatus via the network, and a musical tone is generated based on the received musical tone data. A predetermined program executable by the communication terminal apparatus is received from the server apparatus via the network, and display data for forming the display for use in receiving the musical tone distributing service is received from the server apparatus via the network and is stored. The stored predetermined program is then executed, and at least a part of the display is carried out based on the display data stored in advance according to the predetermined program.

As a result, although it is necessary to receive and store a predetermined program and display data in at least the first access, but from the next access downward, the communication terminal apparatus has only to start an already stored predetermined program and form a necessary display screen according to already stored display data. Thus, even if a plurality of screen display steps are carried out until the purchase of a melody, there is no need for downloading a display screen showing latest information if no such information is required or downloading again the same display screen as the previous one. This reduces the number of times of access to the server apparatus, and enables quick response in screen display. Further, if a packet communication fee is charged according to the amount of communication data, the packet communication fee can be reduced since the amount of display data to be downloaded in each access is limited so that there is no need for downloading all the required display data one by one, thus making it possible to avoid unnecessary communication. Thus, the number of times of access can be reduced to enable quick response in screen display and reduce he communication fee for receiving the service of distribution of musical tone data.

It is preferred that in the above described communication terminal apparatus, the display data includes first display data received and stored together with the predetermined program and used for forming the at least part of the display during execution of the predetermined program.

With this arrangement, the first display data as well as the predetermined program are received and stored when the server apparatus is accessed in order to receive and store the predetermined program, and therefore, the communication terminal apparatus has only to start the already stored predetermined program and use the already stored first display data to form at least a part of the display from the next access downward. This forms necessary display with the minimum number of times of access.

It is more preferred that in the above described communication terminal apparatus, the display data includes second display data that represents a list of occasionally updated musical tone data and is received from the server apparatus via the network during execution of the predetermined program.

With this arrangement, the second display data representing a list of occasionally updated musical tone data is received from the server apparatus via the network during execution of the predetermined program, and therefore, the execution of the predetermined program obtains the data representing a list of up-to-date or desired musical tone data.

To attain the above object, according to a second aspect of the present invention, there is a communication terminal apparatus comprising a display device that displays a keyword input type search screen when receiving a musical tone data distributing service from a server apparatus, a musical tone data receiving device that retrieves desired musical tone data using the search screen displayed by the display device and receives the retrieved desired musical tone data from the server apparatus via the network, a musical tone generating device that generates a musical tone according to the musical tone data received by the musical tone data receiving device, a display data receiving device that receives display data for displaying the search screen from the server apparatus via the network, and a display data storage device that stores the display data received by the display data receiving device, wherein the search screen is displayed based on the display data stored in the display data storage device.

With this arrangement, when a musical tone data distributing service is received, a keyword input type search screen is displayed, and desired musical tone data is retrieved using the search screen displayed by the display device and the retrieved desired musical tone data is received from the server apparatus via the network, and a musical tone is generated according to the musical tone data received by the musical tone data receiving device. Display data for displaying the search screen is received from the server apparatus via the network, and is stored. The search screen is displayed based on the display data stored in the display data storage device.

Therefore, although it is necessary to receive and store display data for displaying the search screen in at least the first access, the search screen can be formed based on the already stored display data from the next access forward. Thus, if the same search screen is required to search for a desired melody in every search, there is no need for downloading the same search screen again. This enables quick display of the search screen without accessing the server apparatus, and enables quick response in screen display. Since the search screen is a keyword input type screen, a musical tone data search result can be obtained only by accessing the server apparatus after inputting necessary data, and this enables the user to obtain a search result by the minimum number of times of access (basically one time of access) to thus reduce the time required for designating a desired melody. Further, the server apparatus does not have to be accessed for searching until necessary data is inputted on the search screen, and this reduces the number of times of access to the server apparatus and prevents unnecessary communication to reduce a packet communication fee that is charged dependently on the amount of communication data. As a result, the present invention reduces the number of times of access, shortens the time required for retrieving a desired melody, and reduces the communication fee.

It is preferred that the above described communication terminal apparatus comprises a program receiving device that receives a java program for cellular phones from the server apparatus via the network, a program storage device that stores the java program received by the program receiving device, a program executing device that executes the java program stored in the program storage device, and wherein the search screen is displayed on the display device based on the java program executed by the program executing device according to the display data stored in the display storage device.

With this arrangement, the java program for cellular phones is received from the server apparatus through the network and is stored, and the stored java program is then executed. The search screen is displayed based on the stored display data according to the executed java program.

To attain the above object, according to a third aspect of the present invention, there is provided a server apparatus for providing a communication terminal device with a musical tone data distributing service, comprising a program transmitting device that transmits a predetermined program executable by the communication terminal apparatus to the communication terminal apparatus via the network, a display data transmitting device that transmits display data for providing the communication terminal device with the musical tone data distributing service to the communication terminal apparatus via the network, and a musical tone data transmitting device that transmits the musical tone data to the communication terminal apparatus via the network in accordance with a request from the communication terminal apparatus using display based on the display data, wherein the communication terminal apparatus receives the predetermined program and the display data via the network and stores the received predetermined program and display data in advance, and is cable of executing the stored predetermined program to display the stored display data.

With this arrangement, when providing the musical tone data distributing service, the server apparatus transmits a predetermined program executable by the communication terminal apparatus to the communication terminal apparatus via the network, and transmits display data for receiving the musical tone data distributing service to the communication terminal apparatus via the network. On the other hand, the communication terminal apparatus receives the predetermined program and the display data via the network and stores them, and executes the stored predetermined program to display the stored display data. Upon receiving a request from the communication terminal apparatus using a display based on the display data, the server apparatus transmits the corresponding musical tone data to the communication terminal apparatus via the network.

Therefore, although the communication terminal apparatus must receive and store a predetermined program executable thereby and display data in at least the first access, it has only to start the already stored predetermined program and form a necessary display screen based on the already stored display data from the next access forward. Thus, even in the case where a plurality of screen display steps are executed until the purchase of a melody, the communication terminal apparatus does not have to download again the same search screen as the previous display screen. This reduces the number of times of access to the server apparatus to enable quick response in screen display. Further, even if a packet communication fee is charged dependently on the amount of communication data, the packet communication fee can be reduced since the amount of display data to be downloaded in each access is limited so that there is no need for downloading all the required display data one by one, thus making it possible to avoid unnecessary communication. Thus, the number of times of access can be reduced to enable quick response in screen display and reduce he communication fee for receiving the service of distribution of musical tone data.

To attain the above object, according to a fourth aspect of the present invention, there is provided a server apparatus for providing a communication terminal apparatus with a musical tone data distributing service, comprising a display data transmitting device that transmits display data for displaying a keyword input type search screen in providing the musical tone data distributing service to the communication terminal apparatus via a network, and a musical tone data transmitting device that transmits the musical tone data to the communication terminal apparatus via the network in accordance with a request from the communication terminal apparatus using the search screen, wherein the communication terminal apparatus receives the display data via the network and stores the received display data in advance, and is capable of displaying the search screen based on the stored display data.

With this arrangement, when providing the musical tone data distributing service, the server apparatus transmits display data for displaying a keyword input type search screen in receiving the musical tone data distributing service to the communication terminal apparatus via the network. On the other hand, the communication terminal apparatus receives the display data via the network and stores it, and displays the search screen based on the stored display data. If the communication terminal apparatus outputs a request using the search screen, the server apparatus transmits the corresponding musical tone data to the communication terminal apparatus via the network.

Therefore, although the communication terminal apparatus must receive and store display data for displaying a search screen in at least the first access, a search screen may be formed based on the already stored display data from the next access forward. Thus, if the same search screen is required to search for a desired melody in every searching, the communication terminal apparatus does not have to download again the same search screen as the previous display screen. This enables quick display of the search screen without accessing the server apparatus, and enables quick response in screen display. Since the search screen is a keyword input type screen, a musical tone data search result can be obtained by inputting necessary data and accessing the server apparatus for searching, and this enables the user to obtain the search result by the minimum number of times of access (basically one time of access) and shortens the time required for designating a desired melody. Further, the server apparatus does not have to be accessed for searching until necessary data is inputted on the search screen, and this reduces the number of times of access to the server apparatus and prevents unnecessary communication to reduce a packet communication fee that is charged dependently on the amount of communication data. As a result, the present invention reduces the number of times of access, shortens the time required for retrieving a desired melody, and reduces the communication fee.

It is preferred that the server apparatus further comprises a program transmitting device that transmits a java program for cellular phones to the communication terminal apparatus via the network, and wherein the communication terminal apparatus displays the search screen by receiving and storing the java program transmitted from the program transmitting device and executing the stored java program.

To attain the above object, according to a fifth aspect of the present invention, there is provided a method of controlling a communication terminal apparatus, comprising a display step of displaying on a display device a display screen for receiving a musical tone data distributing service from a server apparatus, a musical tone data receiving step of receiving desired musical tone data via a network using the display screen displayed in the display step, a musical tone generating step of generating a musical tone according to the musical tone data received in the musical tone data receiving step, a program receiving step of receiving a predetermined program executable by the communication terminal apparatus from the server apparatus via the network, a display data receiving step of receiving display data for forming the display screen from the server apparatus via the network, a storing step of storing in a memory the predetermined program received in the program receiving step and the display data received in the display data receiving step, and a program executing step of executing the predetermined program stored in the storing step, wherein at least a part of display of the display screen in the display step is carried out based on the display data stored in advance in the storing step, according to the predetermined program executed in the program executing step.

Therefore, although the communication terminal apparatus must receive and store a predetermined program and display data in at least the first access, the already stored predetermined program has only to be started by the communication terminal apparatus to form a necessary display screen based on the already stored display data from the next access forward. Thus, even in the case where a plurality of screen display steps are executed until the purchase of a melody, the communication terminal apparatus does not have to download a display screen showing latest information if no such information is required or download again the same display screen as the previous one. This reduces the number of times of access to the server apparatus to enable quick response in screen display. Further, even if a packet communication fee is charged dependently on the amount of communication data, the packet communication fee can be reduced since the amount of display data to be downloaded in each access is limited so that there is no need for downloading all the required display data one by one, thus making it possible to avoid unnecessary communication. Thus, the number of times of access can be reduced to enable quick response in screen display and reduce he communication fee for receiving the service of distribution of musical tone data.

To attain the above object, according to a sixth aspect of the present invention, there is provided a method of controlling a communication terminal apparatus, comprising a display step of displaying a keyword input type search screen when receiving a musical tone data distributing service from a server apparatus, a musical tone data receiving step of retrieving desired musical tone data using the search screen displayed in the display step and receives the retrieved desired musical tone data from the server apparatus via a network, a musical tone generating step of generating a musical tone according to the musical tone data received in the musical tone data receiving step, a display data receiving step of receiving display data for displaying the search screen from the server apparatus via the network, and a display data storing step of storing in a memory the display data received in the display data receiving step, wherein the display of the search screen in the display step is carried out based on the display data stored in the display data storing step.

To attain the above object, according to a seventh aspect of the present invention, there is provided a method of controlling a server apparatus which provides a communication terminal device with a musical tone data distributing service, the method comprising a program transmitting step of transmitting a predetermined program executable by the communication terminal apparatus to the communication terminal apparatus via a network, a display data transmitting step of transmitting display data for providing the communication terminal device with the musical tone data distributing service to the communication terminal apparatus via the network, and a musical tone data transmitting step of transmitting the musical tone data to the communication terminal apparatus via the network in accordance with a request from the communication terminal apparatus using display based on the display data, wherein the communication terminal apparatus receives the predetermined program and the display data via the network and stores the received predetermined program and display data in advance, and is capable of executing the stored predetermined program to display the stored display data.

To attain the above object, according to a eighth aspect of the present invention, there is provided a storage medium readable by a computer, which stores a program for causing the computer to execute a method of controlling a communication terminal apparatus, the program comprising a display module for displaying on a display device a display screen for receiving a musical tone data distributing service from a server apparatus, a musical tone data receiving module for receiving desired musical tone data via a network using the display screen displayed by the display module, a musical tone generating module for generating a musical tone according to the musical tone data received by the musical tone data receiving module, a program receiving module for receiving a predetermined program executable by the communication terminal apparatus from the server apparatus via the network, a display data receiving module for receiving display data for forming the display screen from the server apparatus via the network, a storing module for storing the predetermined program received by the program receiving module and the display data received by the display data receiving module, and a program executing module for executing the predetermined program stored by the storing module, wherein at least a part of display of the display screen by the display module is carried out based on the display data, stored in advance by the storing module, according to the predetermined program executed by the program executing module.

To attain the above object, according to a ninth aspect of the present invention, there is provided a communication terminal apparatus which receives a musical tone data distributing service by executing a predetermined program, comprising a connecting device that is capable of connecting to a server apparatus that provides the musical tone data distributing service, a display device that provides display for receiving the musical tone data distributing service, a storage device that stores the predetermined program and display data for forming the display of the display device, and a musical tone generating device that generates a musical tone based on the musical tone data, wherein the predetermined program forms a display screen for receiving the musical tone data distributing service according to the display data stored in advance in the storage device, and displays the formed display screen on the display device.

With this arrangement, the communication terminal apparatus is connected to the server apparatus that provides the musical tone data distributing service via the network, displays a display screen for receiving the musical tone data distributing service, and stores a predetermined program for receiving the distributing service and display data for forming the display to thus generate musical tones according to the musical tone data. The musical tone data distributing service can be received by executing the predetermined program. A display screen for receiving the distributing service is formed based on the stored display data according to the predetermined program, and the formed display screen is then displayed.

Thus, the display screen for receiving the distributing service can be formed based on the already stored display data by executing the already stored predetermined program by the communication terminal apparatus, and this reduces the number of times of access, enables quick response in screen display in the musical tone data distributing service, and reduces the communication fee.

It is preferred that in the communication terminal apparatus, the predetermined program and the display data are received from the server apparatus by the connecting device via the network and are stored in advance in the storage device before receiving the musical tone data distributing service.

It is more preferred that in the communication terminal apparatus, the display data includes first display data used for the predetermined program to form the displays screen for receiving the musical tone data distributing service, and second display data representing a list of occasionally updated musical tone data and received from the server apparatus by the connecting device during execution of the predetermined program.

It should be noted that the "display data" is data for use in displaying a variety of screens such as search screens and input screens for transmitting intentions to select, designate, audit and purchase desired melodies to the server apparatus, and these screens are preferably a menu type operating screen or the like. The "first display data" is data such as characters and drawings for constituting a screen formed according to the "predetermined program". The "first display data" may be received and stored together with the "predetermined program" while embedded in the program, and alternatively, the "first display data" may be received and stored separately from the predetermined program. On the other hand, the "second display data" is received from the server apparatus during execution of the "predetermined program", for instance, and is minimum required data whose contents are not fixed. For example, the "second display data" represents a list of musical compositions (e.g. artist names and melody titles).

Further, the "predetermined program" may be any kind of program insofar as the communication terminal apparatus can singly execute it; for example, an application program that is produced in the java language for cellular phones. This program may be executed separately from the browser software or executed by the browser software.

It should be noted that the "musical tone data" is melody data on incoming call melodies and karaoke melodies, for example.

The above and other objects of the invention will become more apparent from the following drawings taken in conjunction with the accompanying drawings.

BRIEF DESCRIPTION OF THE DRAWINGS

FIGS. 4A–4C are conceptual diagrams showing an example of the format or structure of data stored in a RAM, wherein:

FIG. 4A is a conceptual diagram showing the data stored in the RAM;

FIG. 4B is a conceptual diagram showing a Java application program for cellular phones in FIG. 4A and the structure of incoming call melody data; and FIG. 4C is a conceptual diagram showing musical tone data constituting one of incoming call melodies shown in FIG. 4B;

FIG. 5A is a flow chart showing a java downloading process carried out by the cellular phone;

FIG. 5B is a flow chart showing a java distributing process carried out by the server apparatus;

FIG. 7 is a diagram showing an example of a top page to be displayed;

FIG. 8A is a flow chart showing a new arrival information receiving process carried out in a step S603 in FIG. 6;

FIG. 8B is a flow chart showing a new arrival information receiving process carried out by the server apparatus;

FIGS. 10A–10C are diagrams showing an example of a new arrival list or the like to be displayed, wherein:

FIG. 10A is a diagram showing an example of a first screen;

FIG. 10B is a diagram showing an example of screens displayed in the case where a "next page" button in FIG. 10A is pressed; and FIG. 10C is a diagram showing an example of screens displayed in the case where a "next page" button in FIG. 10B is pressed;

FIGS. 11A–11C are diagrams showing an example of screens displayed from confirmation of a melody to purchase of the melody, wherein:

FIG. 11A is a diagram showing a melody confirmation screen;

FIG. 11B is a diagram showing an audition screen; and

FIG. 11C is a diagram showing a purchase screen;

FIG. 12A is a flow chart showing a melody selecting process carried out in a step S606 in FIG. 6;

FIG. 12B is a flow chart showing a melody searching process carried out by the server apparatus;

DETAILED DESCRIPTION OF THE PREFERRED EMBODIMENTS

The present invention will now be described in detail with reference to the accompanying drawings showing a preferred embodiment thereof.

Figure 1:
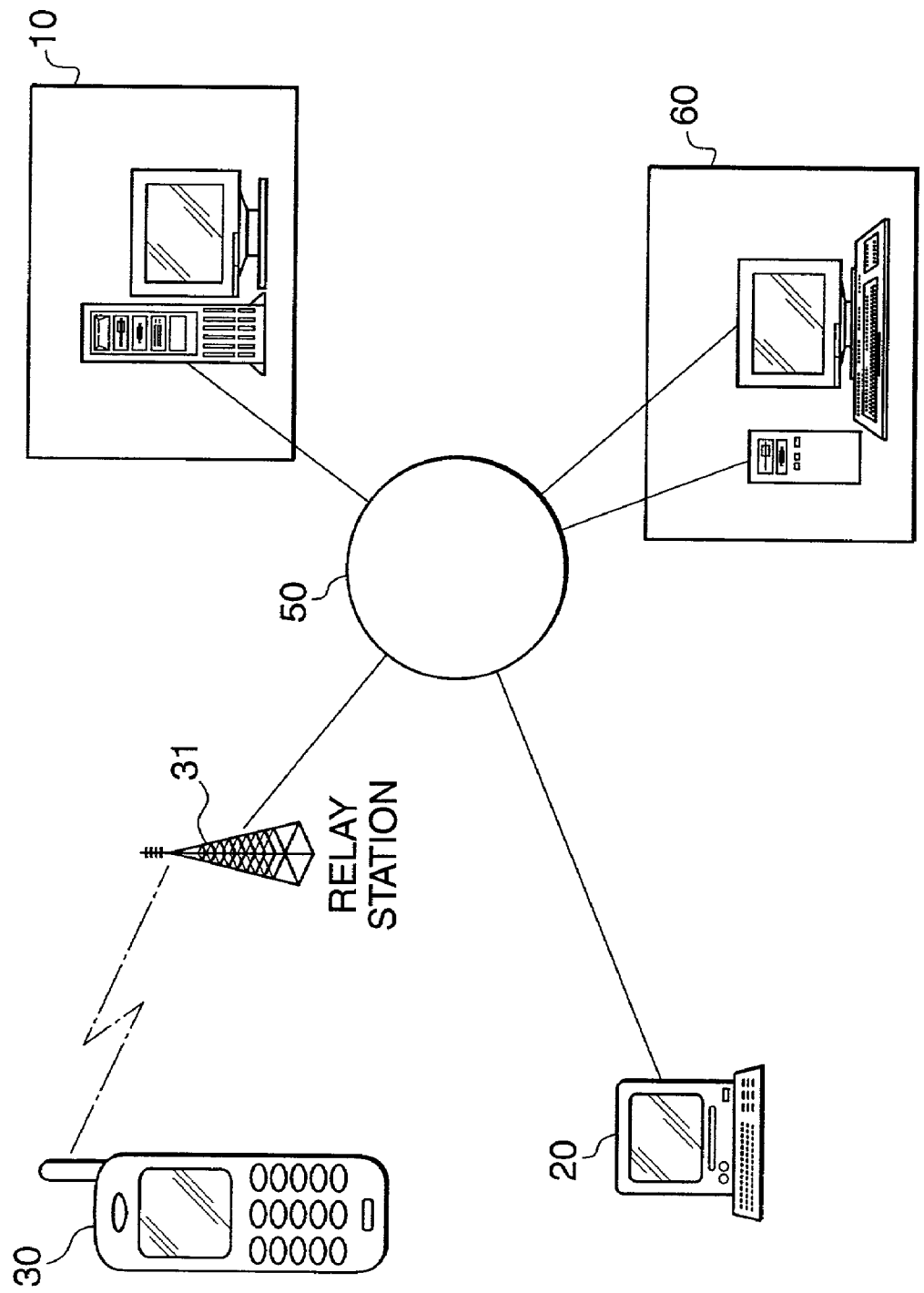
FIG. 1 is a block diagram showing the whole arrangement of a communication system including a communication terminal apparatus and a server apparatus according to an embodiment of the present invention.

FIG. 1 is a block diagram showing the whole arrangement of a communication system including a communication terminal apparatus and a server apparatus according to an embodiment of the present invention. This system is constructed such that cellular phones are able to receive an incoming call melody data distributing service provided by the server apparatus via the Internet.

In this system, the server apparatus 10, a computer 60, and a personal computer 20 are connected to the Internet 50 serving as a communication network, and a cellular phone 30 (communication terminal apparatus) is connected to the Internet 50 via a relay station 31 that is connected thereto through a radio line. The computer 60 functions as a settlement agency for charging a user. Additionally, mobile information tools and others are connected to the Internet 50. Although every component connected to the Internet 50 is illustrated singly, components with similar arrangements are provided in plurality.

Figure 2:
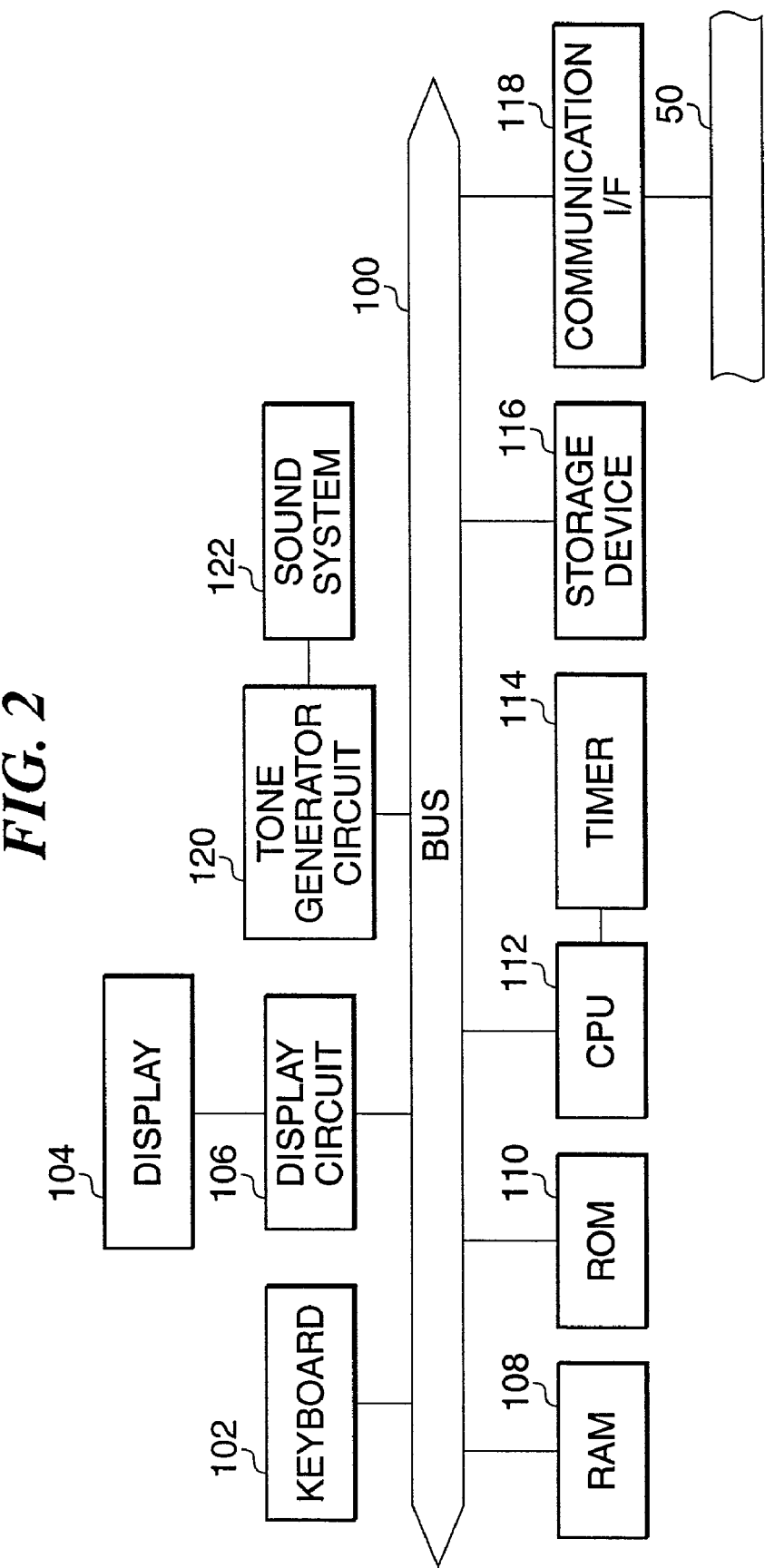
FIG. 2 is a block diagram showing the arrangement of the server apparatus.

FIG. 2 is a block diagram showing the arrangement of the server apparatus 10.

As is the case with ordinary computers, the server apparatus 10 is comprised of a keyboard 102, a display circuit 106, a tone generator circuit 120, a RAM 108, a ROM 110, a storage device 116, and a communication I/F (interface) 118, which are all connected to a CPU 112 via a bus 100. A display 104 is connected to the display circuit 106, and a sound system 122 is connected to the tone generator circuit 120. A timer 114 is also connected to the CPU 112. The communication I/F 118 is connected to the Internet 50.

The keyboard 102 is used for inputting a variety of instructions. The CPU 112 controls the server apparatus 10 as a whole. The ROM 110 stores programs, table data, and the like which are executed by the CPU 112. The RAM 108 temporarily stores a variety of input information, operation results, and the like. The timer 114 has a system clock section and a tempo clock section, not shown, and measures an interrupt time in a timer interrupting process and other periods of times. The display circuit 106 causes the display 104 to display a variety of information.

The storage device 116 is implemented by a hard disk, for example. The storage device 116 stores a Java applet and display data (both of them will be described later). They are updated as the need arises.

The communication I/F 118 sends and receives data to and from the communication terminal apparatus 30 and others via the Internet 50. The tone generator circuit 120 generates a musical tone signal. The sound system 122 is comprised of a speaker or the like, and generates a musical tone by converting a musical tone signal outputted from the tone generator circuit 120 into sound.

Figure 3:
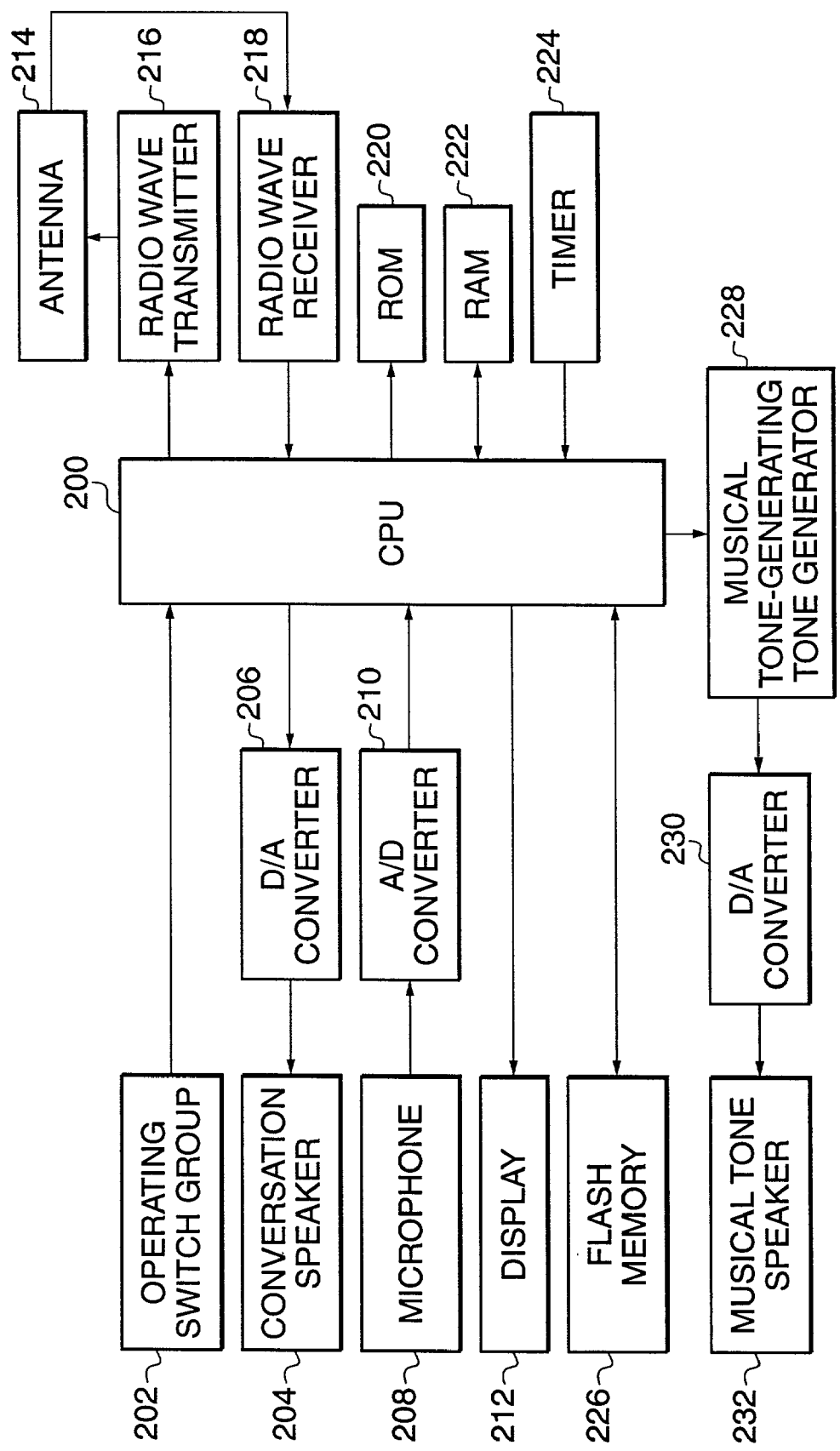
FIG. 3 is a block diagram showing the arrangement of a cellular phone.

FIG. 3 is a block diagram showing the arrangement of the cellular phone 30.

The cellular phone 30 is comprised of an operating switch group 202, a D/A converter 206, an A/D converter 210, a display 212, a flash memory 226, a tone generator 228 for generating musical tones, a radio wave transmitter 216, a radio wave receiver 218, a ROM 220, a RAM 222, and a timer 224, all of which are connected to a CPU 200. A conversation speaker 204 is connected to the D/A converter 206, and a microphone 208 is connected to the A/D converter 210. An antenna 214 is connected to the radio wave transmitter 216 and the radio wave receiver 218, and a musical tone speaker 232 is connected to the tone generator 228 via a D/A converter 230.

The tone generator 228 has a tone generator circuit that reads out musical tone data stored in the RAM 222 and the flash memory 226 according to a musical composition and generates a digital musical tone signal based on the readout musical tone data. A function of reading out the musical tone data according to the musical composition is implemented by a sequencer program stored in the ROM 220, for example, and the CPU 200 controls automatic performance based on the musical tone data. The digital musical tone signal outputted from the tone generator 228 is digital-to-analog converted by the D/A converter 230 and is sounded as a musical tone via the musical tone speaker 232. It should be noted that any kinds of the tone generator 228, the D/A converter 230, and the musical tone speaker 232 may be used insofar as they are capable of sounding incoming call melodies.

The flash memory 226 is a nonvolatile and rewritable memory in which various kinds of data are stored in advance. The ROM 220 stores programs such as browser software that is executed by the CPU 200. The RAM 222 temporarily stores various data, and functions as a work area used when the CPU 200 executes various programs. According to the present embodiment, a Java applet and display data (both of them will be described later) as well as incoming call melody data transmitted from the server apparatus 10 are also stored in the RAM 222.

Figure 4C:
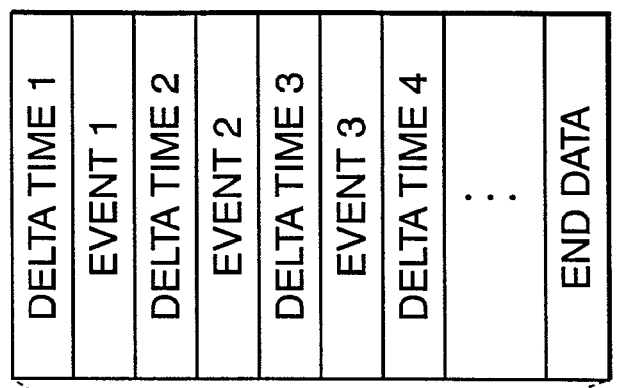
Figure 4B:
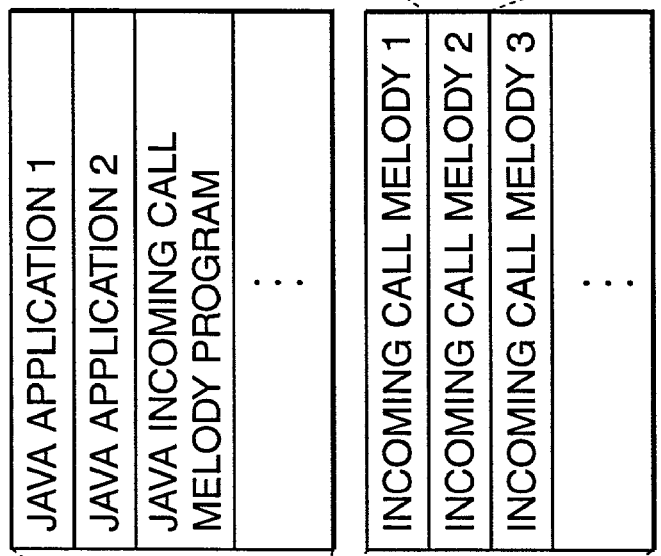
Figure 4A:
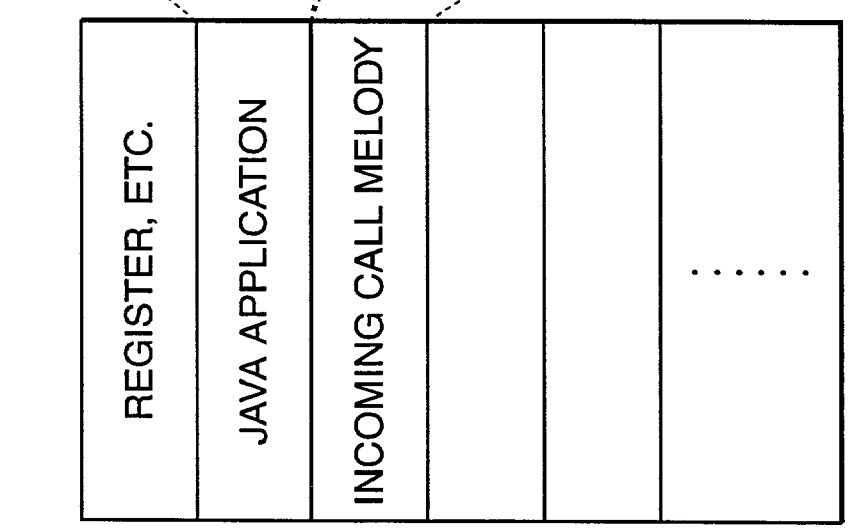

FIGS. 4A to 4C are conceptual diagrams showing an example of the structure of data stored in the RAM 222. FIG. 4A shows the data stored in the RAM 222. FIG. 4B shows the data format of Java application programs and incoming call melodies for cellular phones. FIG. 4C shows musical tone data constituting one of the incoming call melodies in FIG. 4B.

As shown in FIG. 4A, a Java application program (hereinafter also referred to as "Java application" or "Java applet") for cellular phones and an incoming call melody (incoming call melody data: musical tone data) as well as various registers, etc. are stored in the RAM 222.

The word "Java applet" generally means a program operating on the WWW browser, but according to the present embodiment, the Java applet is a special application program based on the Java language, which is simplified for cellular phones, and is called "i-java" in the i mode. As shown in FIG. 4B, plural kinds (about ten) of programs such as java applications 1 and 2 and java incoming call melody programs (predetermined programs) may be stored as the Java application in the RAM 222.

According to the present embodiment, the java incoming melody programs constitute the java applet for use in displaying operating screens required for downloading an incoming call melody, accessing the server apparatus 10, and the like, and a part of display data required on this occasion is also included in the java incoming call melody programs. The display data included in the java incoming call melody programs is core data for use in displaying a screen in each step, which is displayed every time a musical composition is selected, audited, purchased, or the like. The details of the display data will be described later.

The java applications 1 and 2 are basically identical with the java incoming call melody programs, and they are different applications provided by different providers or one provider. The java applications 1 and 2 may be other kinds of applet for providing different services from those provided by the java incoming call melody programs.

It should be noted that the cellular phone 30 is capable of executing the Java applet stored in the RAM 222, but is functionally designed to be incapable of starting the Java applet and the browser software at the same time.

An incoming call melody is obtained by carrying out an incoming call melody receiving process (FIG. 15), described later, and data on a plurality of melodies such as an incoming call melody 1, an incoming call melody 2, . . . can be stored (FIG. 4B). Musical tone data on each of the incoming call melodies is comprised of delta time data, event data, end data, and so forth. The musical tone data is represented by an MIDI code or the like for use in automatic performance, and is particularly comprised of an MIDI code (changed from MFI: Melody for i-mode) that is simplified for cellular phones.

The delta time data represents timing in which the event data is generated. The event data is comprised of key-on event data for giving an instruction for sounding a musical tone, and key-off event data for giving an instruction for muffling a musical tone being sounded. The end data indicates the end of the melody. The musical tone data additionally includes tempo data, not shown, that represents the tempo of the entire melody.

The key-on event data is comprised of key-on data for instructing the tone generator 228 to sound a musical tone, a note number that represents a pitch of the event, and velocity data that represents a velocity of the event. Although the data structure of the key-off event data is not illustrated, the key-off event data is comprised of key-off data for instructing the tone generator 228 to muffle a musical tone being sounded. It should be noted that the velocity data may be included in the key-off event data as is the case with the key-on event data.

FIG. 5A is a flow chart showing a java downloading process carried out by the cellular phone 30. FIG. 5B is a flow chart showing a java distributing process carried out by the server apparatus 10. The CPU 200 in the cellular phone 30 executes the java downloading process, and the CPU 112 in the server apparatus 10 executes the java distributing process. Since both processes are carried out correspondingly to each other, they are illustrated side by side. It should be noted that the connection to the Internet 50 based on the java incoming call melody program is implemented by a communication protocol, which is a simplified version of the HTTP (Hyper Text Transfer Protocol).

First, in the cellular phone 30, an Internet connection mode is selected by means of a key, not shown, in a step S501 in FIG. 5A, and the browser software is started. Upon selection of an incoming call melody service site, a URL thereof is transmitted to the Internet 50. Accordingly, a HTML file (Hyper Text Markup Language) file of a top page (menu page) is transmitted from the server apparatus 10, and the top page (menu page) is then displayed to show menu buttons such as a "java incoming call melody download" button, not shown, on the display 212 in a step S502. If the "java incoming call melody download" button is then selected, the corresponding URL is transmitted to the server apparatus 10.

In response to this, the java incoming call melody program is transmitted from the server apparatus 10, which is received in the next step S503. During the receiving operation, a message "downloading" is displayed, and after the downloading is completed, the java incoming call melody program is stored in a java application storage device; area of the RAM 222 and the browser software is finished to terminate the process. As described above, the java incoming call melody program includes the screen display data required for carrying out the later procedure such as the purchase of a melody, and is stored in the RAM 222.

It may be so arranged that when the java incoming call melody is downloaded, it is possible to register a telephone number of the cellular phone 30 in the server apparatus 10 to facilitate subsequent purchase of an incoming call melody.

On the other hand, in a step S511 in FIG. 5B, the server apparatus 10 waits for the user to access. If a URL is transmitted from the cellular phone 30 as a result of the process carried out in the step S501, it is determined that the user has accessed the server apparatus 10, and the program proceeds to a step S512 wherein an HTML file of a top page (menu page) is transmitted to the cellular phone 30, which is the source of transmission of the URL, via the Internet 50. In the next step S513, the server apparatus 10 waits for the user to access again. If a URL is transmitted from the cellular phone 30 as a result of the process carried out in the step S502, it is determined that the user has accessed the server apparatus 10, and the program proceeds to a step S514 wherein the java incoming call melody program is transmitted to the cellular phone 30, which is the source of transmission of the URL, via the Internet 50 to terminate the process.

It should be noted that neither the java incoming call melody program nor the display data is stored in the RAM 222 of the cellular phone 30 when it is shipped as equipment. Therefore, in order to receive the incoming call melody service according to the present embodiment, it is necessary to carry out the process in FIG. 5A at least once. Incidentally, if the contents of the java incoming call melody program or display data are updated, the server apparatus 10 may provide the cellular phone 30 with information to this effect by electronic mail or the like to cause the cellular phone 30 to update data. For update, the process in FIG. 5A is carried out again.

By carrying out the process in FIGS. 5A and 5B, the java incoming call melody program with the display data is downloaded from the server apparatus 10, and is stored in the RAM 222 of the cellular phone 30.

Figure 6:
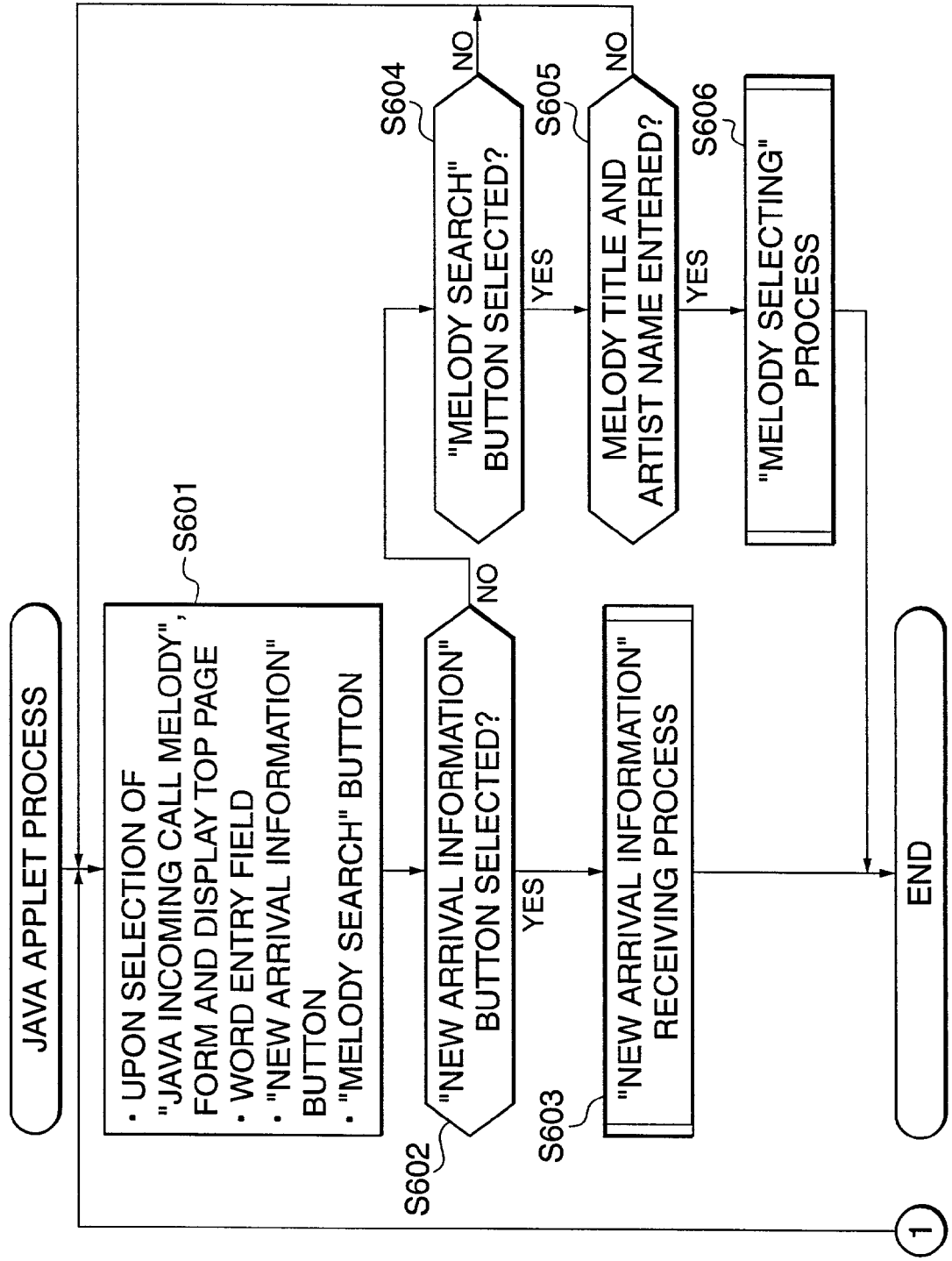
FIG. 6 is a flow chart showing a java applet process carried out by the cellular phone.

FIG. 6 is a flow chart showing a java applet process carried out by the cellular phone 30. The CPU 200 carries out this process after the java incoming call melody program is stored in the RAM 222 of the cellular phone 30.

First, a selection screen called "i-java menu" is displayed on the display 212 (not illustrated) in a step S601. The java applet such as the above-mentioned java applications 1, 2 and java incoming call melody program in FIG. 4B that have already been stored in the RAM 222 are displayed on the selection screen. If the java incoming call melody program is selected from them, the selected java incoming call melody program is started. It should be noted that the browser software is never started in this process, and the subsequent steps are not executed according to the browser software but executed according to the java incoming call melody program. Upon start of the java incoming call melody program, a top page in FIG. 7, referred to later, is formed and displayed on the display 212.

There are two kinds of the display data: display data (hereinafter referred to as "core display data (first display data)") that is downloaded with the java incoming call melody program in the step S503 in FIG. 5A, and display data that is downloaded in different timing from the java incoming call melody program.

The core display data represents characters, drawings, etc. and is used for constituting a screen formed by the java incoming call melody program. On the other hand, the display data (display data other than the core display data=second display data) that is downloaded in different timing from the java incoming call melody program is downloaded from the server apparatus 10 during execution of the java incoming call melody program, for instance, and is minimum required data whose contents to be displayed are not fixed but are occasionally updated. For example, the second display data represents a list of musical tones and musical compositions (e.g. the artist names and the melody titles).

Figure 10A:
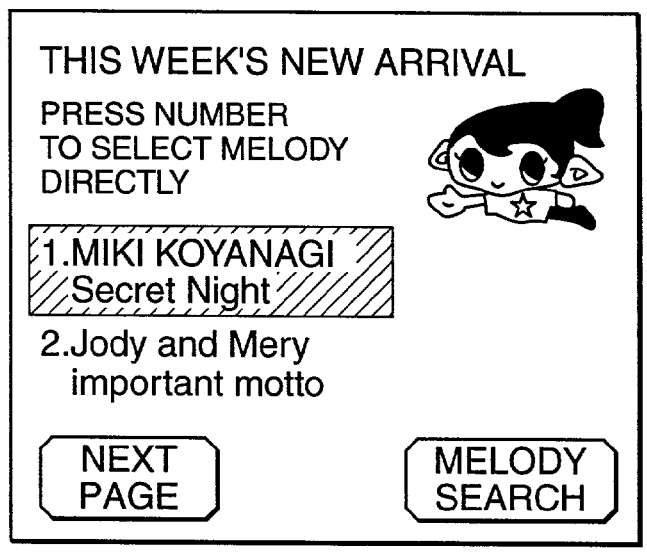
Figure 10B:
Figure 10C:
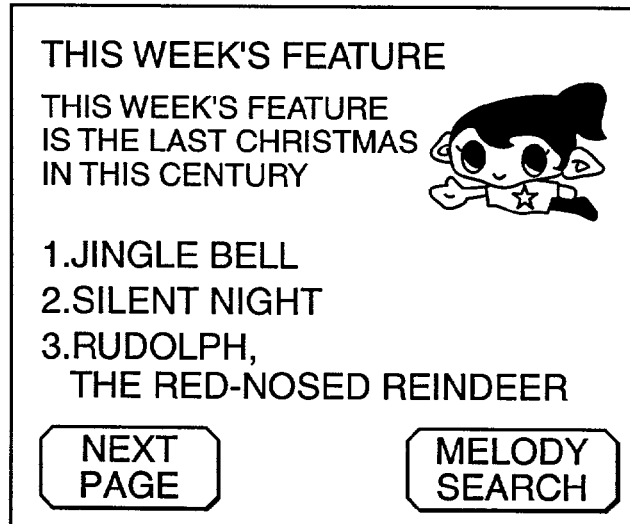
Figure 11A:
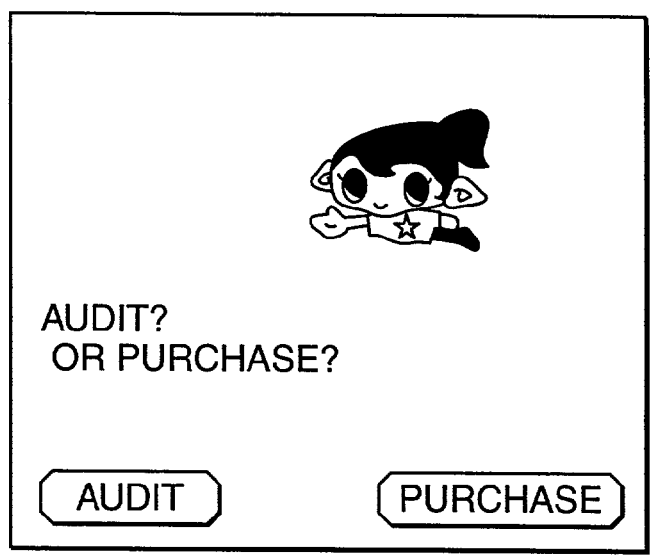
Figure 11B:
Figure 11C:
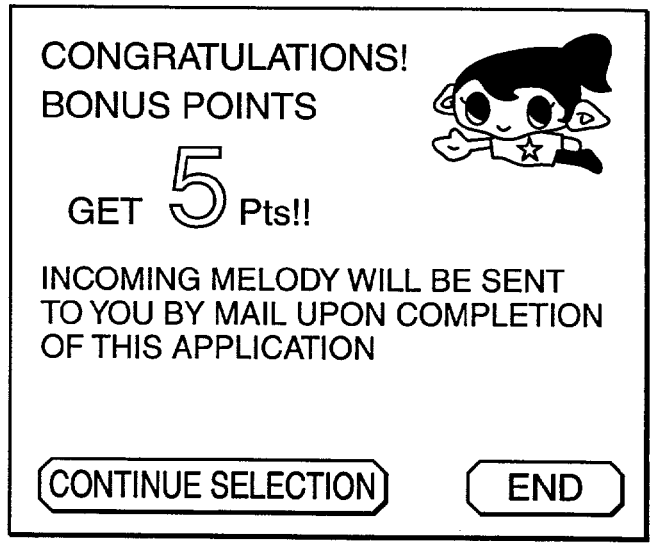

According to the present embodiment, a top page shown in FIG. 7, referred to later, and images shown in FIGS. 11A to 11C except for a numeral "5" in FIG. 11C are all handled as the core display data. Although images shown in FIGS. 10A–10C, referred to later, are not defined as the core display data, the images except for the artist names and the melody titles in FIGS. 10A to 10C may be handled as the core display data. Further, although images shown in FIG. 14, referred to later, are not defined as the core display data, the title "melody search", explanations, and the like may be handled as the core display data.

It should be noted that in this embodiment, all of the core display data is downloaded and stored together with the java incoming call melody program in a state in which the core display data is embedded in the java incoming call melody program. The core display data is embedded in the java incoming call melody program in units of message data comprised of characters, drawing data, etc. Incidentally, all or a part of the core display data may be downloaded in different timing from the java incoming call melody program.

FIG. 7 is a diagram showing an example of the top page to be displayed. On the top page, a "new arrival information"

button and a "melody search" button are displayed as selection keys, and entry fields in which an artist name and a melody title are entered using free words (e.g. in hiragana letters) are displayed. That is, the top page serves as a so-called keyword input type search screen. Display data for use in forming this display screen is core display data that is downloaded as the java incoming call melody program and stored in the RAM 222 in the step S503 in FIG. 5A. Therefore, at this point (step S601), there is no need for accessing the server apparatus 10, and no packet communication fee is charged and the display data is displayed with quick response.

To display the display data, data in a suitable size for the display 212 of the cellular phone 30 is obtained in advance, and the data such as characters and drawings is displayed at the optimum position. If the display data is core display data, the display data is embedded in the java incoming call melody program in units of message data comprised of characters, drawing data, etc. By designation according to the java incoming call melody program, the data is displayed at a proper position on the display 212 for linking.

Referring again to FIG. 6, it is determined in the next step S602 whether the "new arrival information" button has been selected or not. If it is determined that the "new arrival information" button has been selected, a new arrival information receiving process in FIGS. 8A and 9A, referred to later, is carried out in a step S603 to terminate the process. If it is determined that the "new arrival information" button has not been selected, it is determined whether the "melody search" button has been selected or not (step S604). If it is determined that the "melody search" button has not been selected, the program returns to the step S601, and if it is determined that the "melody search" button has been selected, it is determined whether or not a melody title or an artist name has been entered in the entry fields (step S605).

If it is determined that neither a melody title nor an artist name has been entered in the entry fields, the program returns to the step S601. If it is determined that a melody title or an artist name has been entered in the entry fields, the program proceeds to a step S606 wherein a melody selecting process in FIGS. 12A and 13A, referred to later, is carried out to terminate the process.

It should be noted that, in terms of safety, the java incoming call melody program downloaded from the server apparatus 10 is configured to operate only when the server apparatus 10 as the service site is accessed.

Figure 9B:
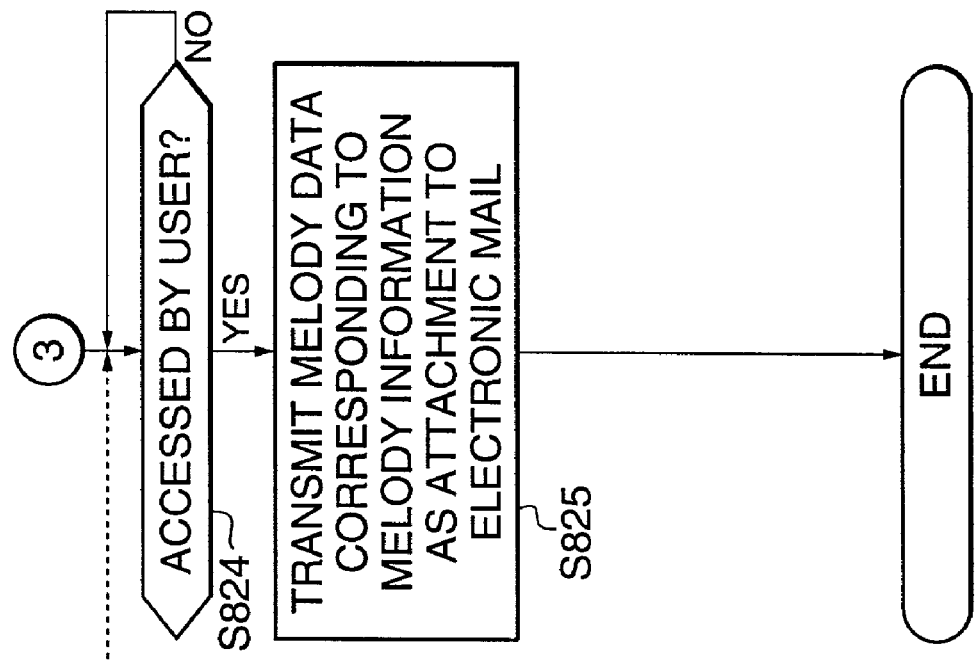
FIG. 9B is a flow chart showing a continued part of the FIG. 8B process.
Figure 9A:
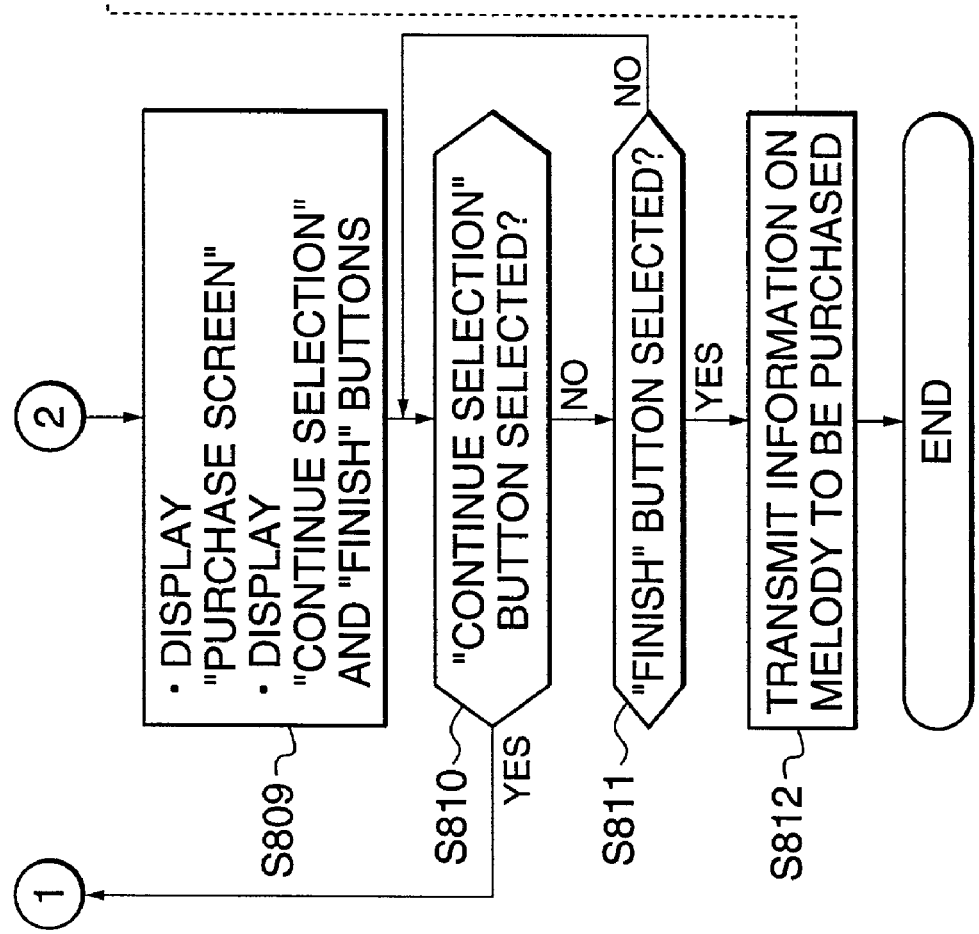
FIG. 9A is a flow chart showing a continued part of the FIG. 8A process.

FIGS. 8A and 9A are flow charts showing the new arrival information receiving process carried out in the step S603 in FIG. 6. FIGS. 8B and 9B are flow charts showing a new arrival information distributing process carried out by the server apparatus 10. The CPU 112 in the server apparatus 10 carries out the new arrival information distributing process. Both processes are carried out correspondingly to each other, and thus they are illustrated side by side.

First, the cellular phone 30 transmits a URL corresponding to new arrival information in a step S801 in FIG. 8A. In response to this, a list of new arrivals (text file) is transmitted from the server apparatus 10 as described later, and accordingly, in a step S802, the received new arrival list is captured to form and display a display screen showing a page of the new arrival list on the display 212.

FIGS. 10A to 10C are diagrams showing an example of the new arrival list or the like to be displayed, wherein FIG. 10B shows an example of a screen that is displayed in the case where a "next page" button in FIG. 10A is selected, and FIG. 10C shows an example of a screen that is displayed in the case where a "next page" button in FIG. 10B is selected.

Since all the titles in the new arrival list cannot be displayed once on the display 212, the titles of several melodies are displayed first as shown in FIG. 10A. On the display screen showing the new arrival list, the "next page" button and a "melody search" button are displayed as selection keys and, in particular, the title "this week's new arrival" and explanations are displayed on the first display screen. If the "next page" button is selected on the first display screen showing the new arrival list, the display screen shows the titles of other new arrival melodies are displayed as shown in FIG. 10B.

It should be noted that in this embodiment, the information to be displayed is not limited to the new arrival information, but information on this week's featured melodies is also displayed at the end of the new arrival information as shown in FIG. 10C. A special selection button may be provided on the top page in FIG. 7 so that such information on featured melodies can be accessed immediately.

The new arrival information list in FIGS. 10A to 10C is updated occasionally (e.g. every day), and it is therefore necessary to download the list from the server apparatus 10 every time the java incoming call melody program is started to receive the service. However, the title "this week's new arrival" and the explanations, the buttons in FIGS. 10A to 10C, and the like are hardly updated, and thus, they may be downloaded and stored as the core display data together with the java incoming call melody program at the time of the first access so that they can be used again in the next process.

On the display screen showing the new arrival information list, the items can be selected and designated using a cursor key, a decision key, or the like, not shown, provided in the cellular phone 30. The user shifts the focus by means of the cursor key to invert the display of the title of a desired melody and then presses the decision key to select and designate the melody. The cursor key and the decision key may be substituted by arbitrarily assigned numeric keys provided in the cellular phone 30.

A desired melody may be directly selected and designated by designating a sequence number given to the title of the melody. As described later, the same process is carried out in the case where the "melody search" button is selected on any of the display screens in FIGS. 10A to 10C as in the case where the "melody search" button is selected on the top page in FIG. 7.

Referring again to FIG. 8A, it is determined in the next step S803 whether a melody has been selected or not. If it is determined that no melody has been selected, the program returns to the step S802, and if it is determined that a melody has been selected, a melody confirmation screen is displayed (step S804).

FIGS. 11A to 11C are diagrams showing examples of screens to be displayed from the confirmation a melody to purchase of the melody, wherein FIG. 11A shows the melody confirmation screen, FIG. 11B shows an audition screen, and FIG. 11C shows a purchase screen. An animation of a character, a message asking whether a melody is to be audited or purchased, an "audit" button, and a "purchase" button are displayed on the music confirmation screen in FIG. 11A. It should be noted that display data (core display data) for use in forming the melody confirmation screen is downloaded in the same timing as the top page, and at this point (step S804), there is no need for obtaining the display data again from the server apparatus 10. Thus, no packet communication fee is charged, and the display data can be displayed with quick response.

On the melody confirmation screen, it is then determined whether the "audit" button has been selected or not (step S805). If it is determined that the "audit" button has not been selected, the program proceeds to a step S808 where it is determined whether the "purchase" button has been selected or not. If it is determined that the "purchase" button has not been selected, the program returns to the step S804 to continue displaying the melody confirmation screen.

On the other hand, if it is determined in the step S805 that the "audit" button has been selected, melody information corresponding to a melody selected and designated as a melody to be audited at this point is transmitted to the server apparatus 10 (step S806). In response to this, a melody corresponding to the melody information, i.e. melody data (incoming call melody) on a melody desired by the user is transmitted from the server apparatus 10, and thus, the program proceeds to a step S807 for carrying out an audition process.

More specifically, the audition screen in FIG. 11B is displayed, and the melody data transmitted from the server apparatus 10 is received and provisionally stored in the RAM 222. After receipt of the melody data, the provisionally stored melody data is sequentially read out to generate musical tones by the tone generator 228. As is the case with the melody confirmation screen, the audition screen is downloaded together with the top page in FIG. 7 and does not have to be downloaded again from the server apparatus 10. After the audition, the program returns to the step S804 via the step S808. When a "STOP" button is pressed on the audition screen, the audition is stopped on the way and the program returns to the step S804 via the step S808.

On the other hand, if it is determined in the step S808 that the "purchase" button has been selected, the purchase screen in FIG. 11C is displayed (step S809 in FIG. 9A). A message "congratulations", a bonus point, an explanation indicating that an incoming call melody will be sent by electronic mail, a "continue selection" button, and a "finish" button are displayed on the purchase screen. The "continue selection" button is a button that is pressed to audit or purchase the currently selected melody or other melodies. The "finish" button is a button that is pressed to give an instruction for purchasing a melody or melodies (only one melody should not necessarily be selected or designated) selected and designated at this point.

On the purchase screen, a numeral such as "5" representing the bonus point is assumed to vary according to melodies and timing and is thus downloaded from the server apparatus 10 every time the server apparatus 10 is accessed, but the other display data such as explanations is downloaded as core display data with the top page in FIG. 7. It is therefore unnecessary to download such core display data again from the server apparatus 10.

In the next step S810, it is determined whether or not the "continue selection" button has been selected or not. If it is determined that the "continue selection" button has been selected, the program returns to the step S601 in FIG. 6, and if it is determined that the "continue selection" button has not been selected, the program proceeds to a step S811 wherein it is determined whether the "finish" button has been selected or not on the purchase screen. If it is determined that the "finish" button has not been selected, the program returns to the step S810, and if it is determined that the "finish" button has been selected, purchase melody information corresponding to a melody selected and designated at this point as a melody to be purchased is transmitted to the server apparatus 10 (step S812) to terminate the process.

Accordingly, the server apparatus 10 carries out the new arrival information distributing process in FIGS. 8B and 9B.

First, the server apparatus 10 waits for the user to access in a step S820 in FIG. 8B. When a URL is transmitted from the cellular phone 30 as a result of the process carried out in the step S801, it is determined that the user has accessed the server apparatus 10 and the program proceeds to a step S821 wherein a CGI (Common Gateway Interface) is started to generate and transmit new arrival information to the cellular phone 30 via the Internet 50.

In the next step S822, the server apparatus 10 waits for the user to access again. If information on a melody selected as the audition melody is transmitted from the cellular phone 30 as a result of the process carried out in the step S806 in FIG. 8A, it is determined that the user has accessed the server apparatus 10 and the program proceeds to a step S823 wherein melody data (incoming call melody) corresponding to the above-mentioned melody information is transmitted to the cellular phone 30. The melody information on a melody to be audited and the purchase melody information on a melody to be purchased are transmitted to different URLs, and thus, according to the URL, the server apparatus 10 determines whether the cellular phone 30 requires audition or purchase.

In the next step S824, the server apparatus 10 waits for the user to access again. If purchase melody information on a melody selected and designated as a melody to be purchased is transmitted form the cellular phone 30 as a result of the process carried out in the step S812 in FIG. 8B, it is determined that the user has accessed the server apparatus 10 and the program proceeds to a step S825 wherein melody data (incoming call melody) corresponding to the purchase melody information is transmitted as an attachment to an electronic mail to the cellular phone 30 to terminate the process.

According to the present embodiment, it is designed that upon completion of the java incoming call melody program, the cellular phone 30 erases melody data downloaded for audition, and thus, for distribution in purchase, melody data is transmitted as an attachment file to an electronic mail as described above. However, it may be designed that the cellular phone 30 can purchase data downloaded for audition.

By carrying out the processes in FIGS. 8A and 8B and FIGS. 9A and 9B, the user can audit melodies in the new arrival information list as required and purchase a desired melody by operating the display on the screen. On this occasion, a part of the screens displayed step by step until the purchase of a melody is formed based on display data that is obtained and stored at the same time as downloading of the java incoming call melody program.

Figure 13B:
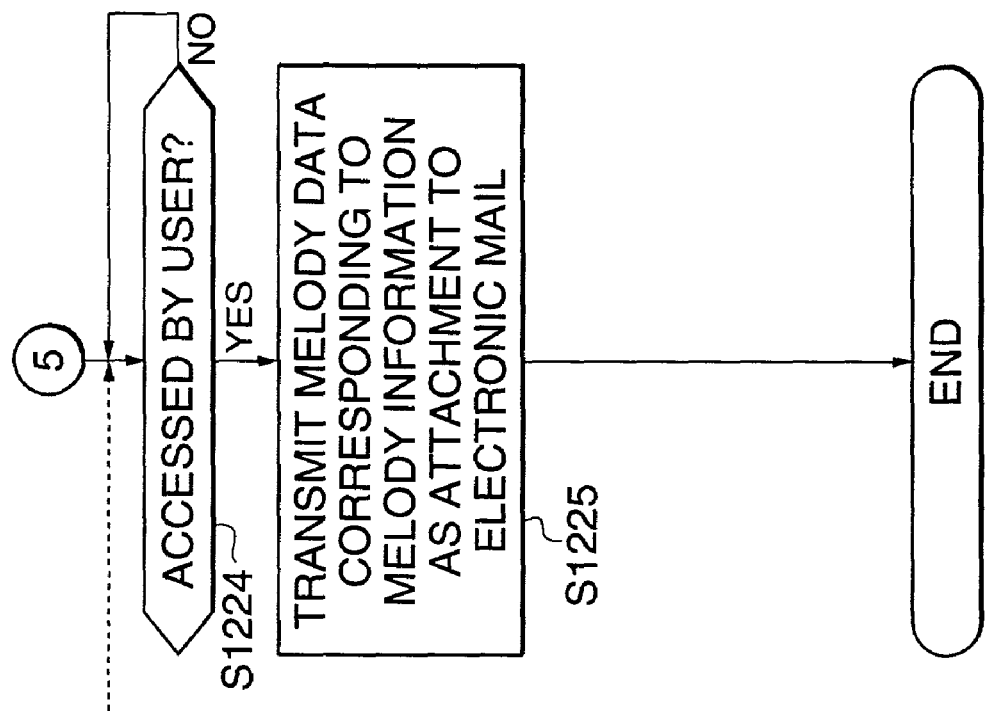
FIG. 13B is a flow chart showing a continued part of the FIG. 12B process.

FIGS. 12A and 13B are flow charts showing a melody selecting process carried out in the step S606 in FIG. 6. FIGS. 12B and 13B are flow charts showing a melody searching process carried out by the server apparatus 10. The CPU 112 in the server apparatus 10 carries out the melody searching process. Both processes are carried out correspondingly to each other, and thus, they are illustrated side by side.

First, the cellular phone 30 transmits free word information representing a melody title and/or an artist name entered on the top page (search screen) in FIG. 7 to the server apparatus 10 in a step S1201 in FIG. 12A. In response to this, a search result list is transmitted from the server apparatus 10 as described later, and accordingly, in a step S1202, the received search result list is captured to form and display a display screen showing the search result list on the display 212.

Figure 14:
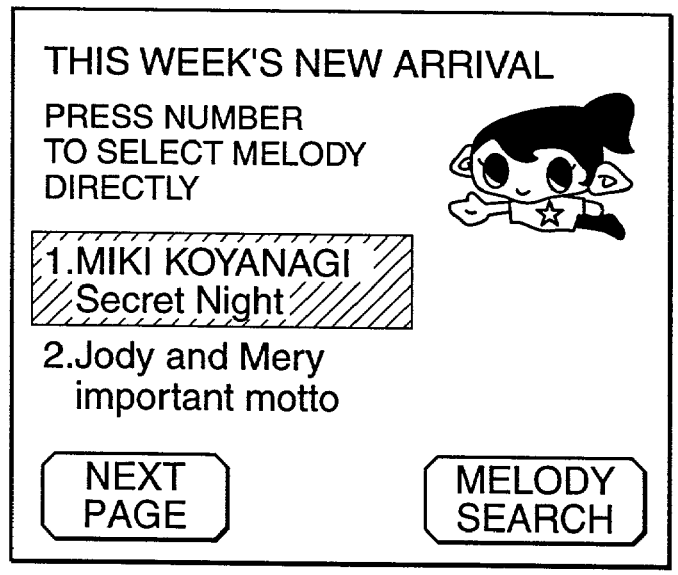
FIG. 14 is a diagram showing an example of a search result list to be displayed.

FIG. 14 is a diagram showing an example of the search result list to be displayed. Since all the contents of the search result list may not be displayed once on the display 212, the titles of several melodies are displayed first as shown in FIG. 14. On the other hand, if proper free words are entered, the range of the search result that is pertinent is considerably narrowed down so that all the melody titles can be displayed on one page since a limited number of melody titles are displayed in the search result list. In this case, a desired melody can be reached substantially by one access to the server apparatus 10. On the display screen showing the search result list, the same selection keys are displayed and operated in the same manner as on the display screens (FIGS. 10A–10C) showing the new arrival list. If any melody titles have not yet been displayed in the case where the "next page" button is selected, the titles of other search melodies are displayed on the display screen, as is the case with the display in FIG. 10B.

Since the search result list usually differs in every search, it is necessary to download the search result list from the server apparatus 10 every time searching is carried out. However, the title "search melody", explanations, etc. in FIG. 14, for example, can always be displayed the same, and only display data for displaying such title and explanations can be downloaded and stored as core display data with the java incoming call melody program in the first access and used for next processing, as is the case with the top page in FIG. 7.

Referring again to FIG. 12A, it is determined in the next step S1203 whether or not a melody has been selected from the search result list. If it is determined that no melody has been selected, the program returns to the step S1202, and if it is determined that a melody has been selected, the program proceeds to a step S1204. In the steps S1204 to S1212, the same process as in the steps S804 to S812 in FIGS. 8A and 9A is carried out to terminate the process.

Figure 13A:
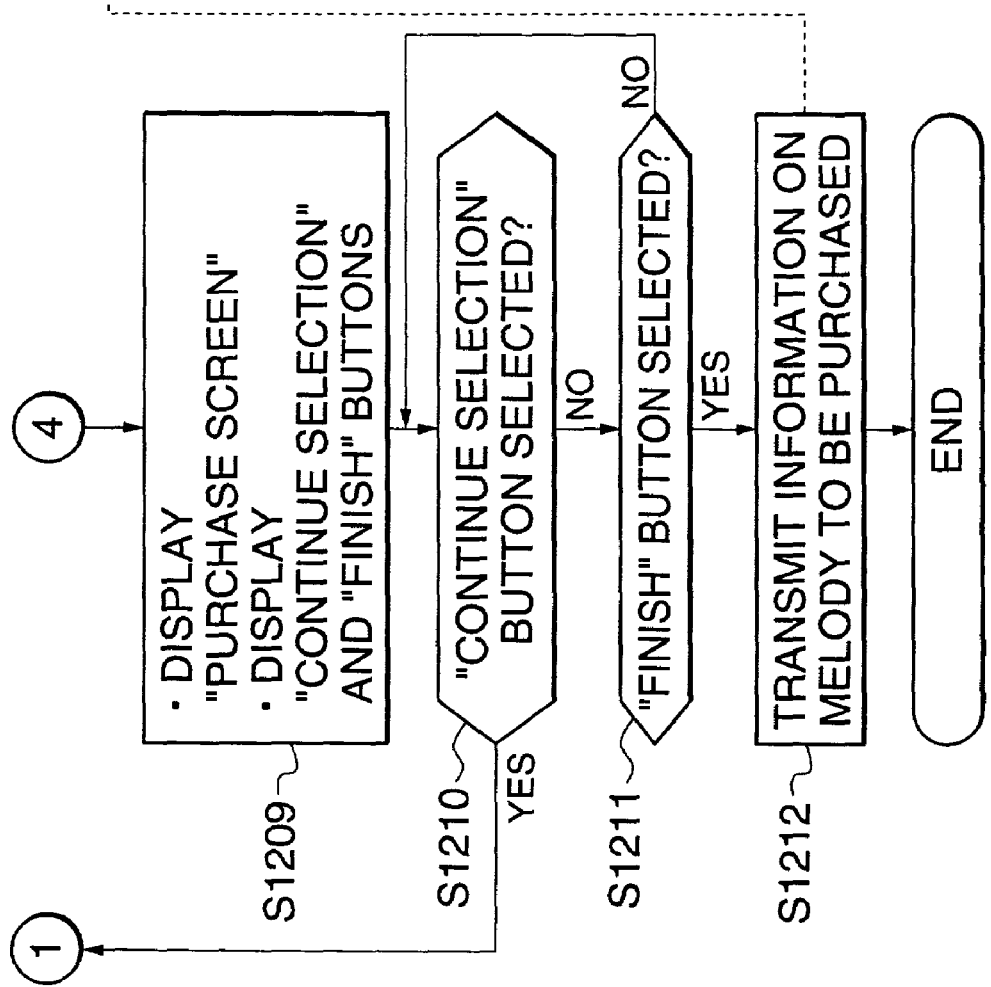
FIG. 13A is a flow chart showing a continued part of the FIG. 12A process.

On the other hand, the server apparatus 10 carries out the melody searching process in FIGS. 12B and 13B correspondingly to the process in FIGS. 12A and 13A. First, in a step S1220, the server apparatus 10 waits for the user to access. If information represented by free words indicating a melody title and/or an artist name is transmitted from the cellular phone 30 as a result of the process carried out in the step S1201 in FIG. 12A, it is determined that the user has accessed the server apparatus 10 and the program proceeds to a step S1221 wherein the CGI is started to generate a search result list and transmit it to the cellular phone 30 via the Internet 50. It should be noted that the search result list includes about ten melodies, and if the number of hit melodies exceeds about ten, a message asking for searching again under different conditions may be returned to the user.

In the flowing steps S1222 to S1225, the same process as in the steps S822 to S825 in FIGS. 8B and 9B is carried out to terminate the process.

By carrying out the processes in FIGS. 12A and 12B and FIGS. 13A and 13B, the user operates the screen display to search for a melody and audit melodies selected from the search result list as required to purchase a desired melody. In this case, a part of the contents displayed on the screens step by step until the purchase of a melody is formed based on display data that is obtained and stored at the same time as downloading of the java incoming melody program.

Figure 15:
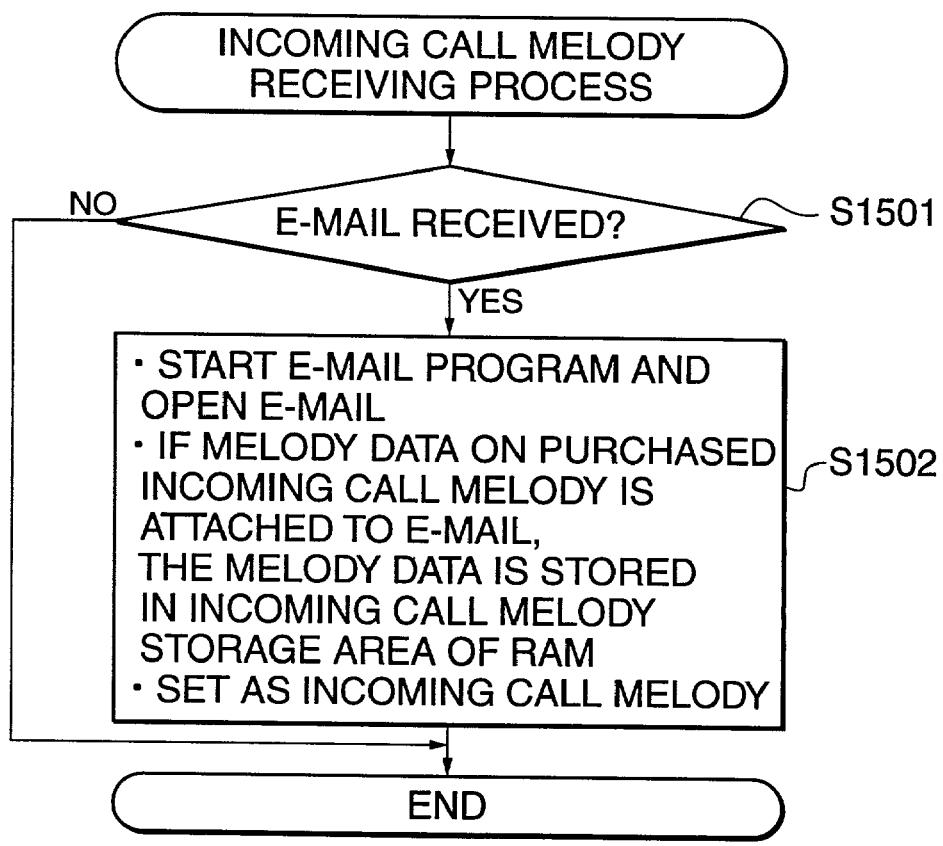
FIG. 15 is a flow chart showing an incoming call melody receiving process.

FIG. 15 is a flow chart showing an incoming call melody receiving process. The CPU 200 in the cellular phone 30 carries out this process. This process is started according to an intention of the user, but if it is configured that when an electronic mail is transmitted from the server apparatus 10 as a result of the process carried out in the step S825 in FIG. 9B or the step S1225 in FIG. 13B, the display 212 shows a message indicating the transmission of an electronic mail is shown on the display 212, the process is started immediately upon receipt of the electronic mail.

First, it is determined in a step S1501 whether an electronic mail has been received or not. If it is determined that no electronic mail has been received, the process is terminated. On the other hand, if it is determined that an electronic mail has been received, the program proceeds to a step S1502 to start an electronic mail reading software program to open the received electronic mail. If any purchased melody data is attached to the electronic mail, the melody data is stored in the incoming call melody storage device; area of the RAM 222 and is set as an incoming call melody so that the melody data can be sounded upon an incoming call. The process is then terminated.

According to the present embodiment, to receive the incoming call melody purchase service, the java incoming call melody program and the display data included therein are downloaded from the server apparatus 10 and stored in advance, and next time an incoming call melody is purchased or the like, the stored java incoming call melody program is started to form a display screen required for purchase or the like by using the stored display data. Although a plurality of screen display steps are carried out until the purchase of a melody and the screen display data must be downloaded from the server apparatus 10 at least once (e.g. in the first search), it is unnecessary to download the same display screen as the previous display screen in subsequent searches.

This reduces the number of times of access to the server apparatus 10, and enables quick response in screen display. Display data to be downloaded in each search is limited, making it unnecessary to download all the required display data one by one in every search, and this prevents unnecessary communication and reduces the packet communication fee depending on the amount of communication data. The quick response enables quick retrieval of a desired melody. Therefore, the present embodiment reduces the number of times of access, enables quick response in screen display in receiving the musical tone data distributing service, and reduces the communication fee.

Further, according to the present embodiment, to receive the incoming call melody service, the top page in FIG. 7 is displayed first. The top page serves as a search screen for inputting free words and the screen is formed using the display data stored during the first access as described above, and this enables the user to obtain a search result by only one access dependently on the input conditions and thus quickly reach a desired melody. Therefore, the present invention does not only enable quick response in screen display and reduces the communication fee but also reduces the time required for designating or specifying a desired melody.

Although the above description of the present embodiment is made based on an example of the incoming melody data obtained by downloading, the present invention may be applied to other musical tone data such as karaoke data.

Further, although the above description of the present embodiment is based on an example in which the cellular phone 30 receives the service, this is not limitative but the present invention may be applied to other communication terminal apparatuses such as a PDA having a function of generating musical tones in addition to communicating, storing, and program-executing functions insofar as a java applet can be applied to such communication terminal apparatuses in the future.

It should be noted that the functions of the sequencer program for generating musical tones, stored in the ROM 220 may be implemented by a java application. In this case, such a java application can be stored as one of the java applications in FIG. 4B in the RAM 222 and is started by the cellular phone 30. The functions of a sequencer program stored in a ROM as in conventional cellular phones cannot be expanded, but the function of a sequencer program implemented by the java applet can be easily expanded by occasionally downloading the latest version.

Further, the incoming call melody distributing service may prompt the user to receive the service by regularly transmitting information such as new arrival information, make the service easily accessible by using a character, or be applied as a communication tool between users, and the present invention may be configured such that these functions can be implemented by a java application. For example, if a character is used, the java application may be configured to implement the functions of causing the character to grow up, talk, quiz, or the like in the cellular phone 30. If the incoming call melody distributing service is applied as a communication tool, it may be provided with a message function to group users having the same hobby according to personal information (e.g. favorite artists) used in downloading or a determination based on a download history to enable intercommunication between the users. In this case, it is possible that characters transfer electronic mails between users, for example.

Further, although in the present embodiment an example is described in which the java incoming call melody program is downloaded and started by the cellular phone 30, the present invention should not be limited to a program using the java language but may be applied to any kinds of software insofar as it can be downloaded and executed by the cellular phone 30. For example, the present invention may be applied to a component-type program such as the Active X incorporated into browser software, etc. if the proper environment is established for the cellular phone.

Although the java incoming call melody program and the display data are obtained for the first time in the first access, but if they are incorporated into the cellular phone 30 when shipped, the number of times of access can be already reduced at the time of the first receipt of the distributing service.

It should be noted that the display data may also include data for displaying sounds as well as the data for displaying screens so that the designation, audition, purchase, etc. of a melody can be sequentially carried out according to an audio guidance.

Further, the present invention may be accomplished by providing the cellular phone 30 and the server apparatus 10 with storage media storing respective control programs of software realizing the functions of the present invention, and causing the respective CPUs of the cellular phones 30 and the server apparatus 10 to read out the control programs from the storage media for execution. In this case, the storage medium storing the program for executing the processing steps in FIGS. 5A and 6 is read out into the cellular phone 30, and the storage medium storing the program for executing the processing steps in FIGS. 5B, 8B, 9B, 12B and 13B is read out into the server apparatus 10.

The storage medium for recording the control program may be a ROM, a floppy disk, a hard disk, an optical disk, a magneto-optical disk, a CD-ROM, a CD-R, a magnetic tape, and a nonvolatile memory card, for instance.

What is claimed is:

1. A communication terminal apparatus comprising:
   a display device that provides a display for receiving a musical tone data distributing service from a server apparatus;
   a musical tone data receiving device that receives desired musical tone data via a network by means of the display provided by said display device;
   a musical tone generating device that generates a musical tone according to the musical tone data received by said musical tone data receiving device;
   a program receiving device that receives a predetermined program executable by the communication terminal apparatus from the server apparatus via the network;
   a display data receiving device that receives display data for forming the display on said display device from the server apparatus via the network;
   a storage device that stores the predetermined program received by said program receiving device and the display data received by said display data receiving device; and
   a program executing device that executes the predetermined program stored in said storage device;
   wherein at least a part of the display for receiving the musical tone data distributing service provided by said display device is carried out based on the display data stored in advance in said storage device, according to the predetermined program executed by said program executing device, without the communication terminal apparatus accessing the server apparatus; and
   wherein the display data includes second display data representing a list of occasionally updated musical tone data and received from the server apparatus via the network during execution of the predetermined program.

2. A communication terminal apparatus which receives a musical tone data distributing service by executing a predetermined program, comprising:
   a connecting device that is capable of connecting to a server apparatus that provides the musical tone data distributing service;
   a display device that provides a display for receiving the musical tone data distributing service;
   a storage device that stores the predetermined program and display data for forming the display of said display device; and
   a musical tone generating device that generates a musical tone based on the musical tone data;
   wherein the predetermined program forms a display screen for receiving the musical tone data distributing service according to the display data stored in advance in said storage device, and displays the formed display screen on said display device, without the communication terminal apparatus accessing the server apparatus; and
   wherein the display data includes first display data stored in advance together with the predetermined program and used for the predetermined program to form the display screen for receiving the musical tone data distributing service, and second display data representing a list of occasionally updated musical tone data and received from the server apparatus by said connecting device during execution of the predetermined program.

* * * * *